US012091842B2

(12) United States Patent
Bohorquez Arevalo et al.

(10) Patent No.: US 12,091,842 B2
(45) Date of Patent: Sep. 17, 2024

(54) METHOD AND SYSTEM TO MONITOR PIPELINE CONDITION

(71) Applicant: THE UNIVERSITY OF ADELAIDE, Adelaide (AU)

(72) Inventors: Jessica Maria Bohorquez Arevalo, Adelaide (AU); Bradley James Alexander, Adelaide (AU); Angus R. Simpson, Adelaide (AU); Martin F. Lambert, Adelaide (AU)

(73) Assignee: THE UNIVERSITY OF ADELAIDE, Adelaide (AU)

( * ) Notice: Subject to any disclaimer, the term of this patent is extended or adjusted under 35 U.S.C. 154(b) by 0 days.

(21) Appl. No.: 17/632,108

(22) PCT Filed: Aug. 3, 2020

(86) PCT No.: PCT/AU2020/000080
§ 371 (c)(1),
(2) Date: Feb. 1, 2022

(87) PCT Pub. No.: WO2021/022315
PCT Pub. Date: Feb. 11, 2021

(65) Prior Publication Data
US 2022/0275610 A1  Sep. 1, 2022

(30) Foreign Application Priority Data
Aug. 2, 2019  (AU) ................. 2019902776

(51) Int. Cl.
E03B 7/00  (2006.01)
E03B 7/07  (2006.01)
(Continued)

(52) U.S. Cl.
CPC .............. *E03B 7/003* (2013.01); *E03B 7/071* (2013.01); *G01M 3/2815* (2013.01); *G01M 3/2823* (2013.01)

(58) Field of Classification Search
CPC .. E03B 7/00–07; E03B 7/071; F17D 5/00–02; G01M 3/00; G01M 3/26–28; G01M 3/2815; G01M 3/2823
See application file for complete search history.

(56) References Cited

U.S. PATENT DOCUMENTS 5,388,445 A * 2/1995 Walters ................. G01M 3/243
                                          73/40.5 R
5,708,193 A    1/1998 Ledeen et al.
(Continued)

FOREIGN PATENT DOCUMENTS

CN    101008992    8/2007
CN    103529365    1/2014
(Continued)

OTHER PUBLICATIONS

International Search Report and Written Opinion for International (PCT) Patent Application No. PT/AU2020/000080, dated Aug. 26, 2020, 7 pages.
(Continued)

Primary Examiner — Nguyen Q. Ha
(74) Attorney, Agent, or Firm — Sheridan Ross P.C.

(57) ABSTRACT

A method and system for real time monitoring of the condition of a pipeline is disclosed. The method comprises continuously monitoring transient pressure information of a fluid in the pipeline, selecting a time window of transient pressure information and processing the time window of transient pressure information to detect an anomaly in the pipeline.

34 Claims, 20 Drawing Sheets

(51) Int. Cl.
*F17D 5/02* (2006.01)
*G01M 3/28* (2006.01)

(56) References Cited

U.S. PATENT DOCUMENTS

| | | | |
|---|---|---|---|
| 10,094,732 B2* | 10/2018 | Linford | G01M 3/243 |
| 2012/0041694 A1 | 2/2012 | Stephens et al. | |
| 2013/0066568 A1 | 3/2013 | Alonso | |
| 2014/0224026 A1 | 8/2014 | Linford et al. | |
| 2016/0356666 A1 | 12/2016 | Bilal et al. | |
| 2017/0122829 A1* | 5/2017 | Skallebæk | G01L 19/086 |
| 2017/0131174 A1 | 5/2017 | Enev et al. | |
| 2018/0202612 A1 | 7/2018 | Simpson et al. | |
| 2018/0321110 A1 | 11/2018 | Gong et al. | |
| 2019/0025151 A1* | 1/2019 | Jestice | G08B 7/06 |
| 2020/0065677 A1 | 2/2020 | Lopez et al. | |

FOREIGN PATENT DOCUMENTS

| | | | |
|---|---|---|---|
| CN | 109931506 | 6/2019 | |
| JP | 06129941 A * | 5/1994 | G01M 3/2825 |
| WO | WO 2009/067770 | 6/2009 | |
| WO | WO 2012/159184 | 11/2012 | |
| WO | WO 2017/008100 | 1/2017 | |
| WO | WO 2017/011850 | 1/2017 | |

OTHER PUBLICATIONS

Mashford et al., "An approach to leak detection in pipe networks using analysis of monitored pressure values by support vector machine," IEEE, Proceedings of the 3rd International Conference on Network and System Security, 2009, pp. 534-539, 6 pages.

Caputo et al., "Using Neural Networks to Monitoring Piping Systems," Process Safety Progress, Jun. 2003, vol. 22(2), pp. 119-127.

Belsito et al., "Leak Detection in Liquefied Gas Pipelines by Artificial Neural Networks," AIChE Journal, Dec. 1998, vol. 44(12), pp. 2675-2688.

Santos et al., "Real-time Monitoring of Gas Pipeline Through Artificial Neural Networks," 2013 BRICS Congress on Computational Intelligence & 11th Brazilian Congress on Computational Intelligence, IEEE, Sep. 8, 2013, pp. 329-334.

Zan et al., "Event Detection and Localization in Urban Water Distribution Network," IEEE Sensors Journal, vol. 14(12), Dec. 1, 2014, pp. 4134-4142.

Abdulla et al., "Pipeline leak detection using artificial neural network: Experimental study," 2013 Proceedings of International Conference on Modelling, Identification F& Control (ICMIC), Cairo University, Egypt, Aug. 31, 2013, pp. 328-332.

Kayaalp et al., "Leakage detection and localization on water transportation pipelines: a multi-label classification approach," Neural Computing and Applications, 2017, vol. 28, pp. 2905-2914.

Mounce et al., "Burst detection using hydraulic data from water distribution systems with artificial neural networks," Urban Water Journal, Mar. 1, 2006, pp. 1-11.

Supplemental European Search Report for European Patent Application No. 20851073.5, dated Jul. 24, 2023 11 pages.

Li Hui "Research on Fault Diagnose Method of Pipeline Leakage Based on Hybrid Model," Northeastern University, Jun. 2013, Master's Thesis, 88 pages (with English translation of p. 12).

* cited by examiner

METHOD AND SYSTEM TO MONITOR PIPELINE CONDITION

CROSS-REFERENCE TO RELATED APPLICATIONS

The present application is a national stage application under 35 U.S.C. 371 and claims the benefit of PCT Application No. PCT/AU2020/000080 having an international filing date of 3 Aug. 2020, which designated the United Stated, which PCT application claims priority from Australian Provisional Patent Application No. 2019902776 titled "METHOD AND SYSTEM TO MONITOR PIPELINE CONDITION" and filed on 2 Aug. 2019, the contents of each of which are incorporated by reference in their entireties.

CROSS-REFERENCE TO CO-PENDING APPLICATIONS

The following co-pending patent application is related to the present application:
PCT Application No PCT/AU2019/000148 (WO2020102846) titled "METHOD AND SYSTEM TO ANALYSE PIPELINE CONDITION", filed on 22 Nov. 2019 in the name of The University of Adelaide.

The content of the above co-pending application is incorporated by reference in its entirety.

TECHNICAL FIELD

The present disclosure relates to monitoring the condition of a pipeline carrying a fluid. In a particular form, the present disclosure relates to a real time pipeline monitoring system based on monitoring the transient pressure characteristics of a fluid in the pipeline.

BACKGROUND

Water transmission and distribution pipelines are critical infrastructure for modern cities. Due to the sheer size of the networks and the fact that most pipelines are buried underground, the health monitoring and maintenance of this infrastructure is challenging. In addition, some water transmission pipelines cover long distances through remote areas that are not easily inspected on a regular basis. Similarly, pipes and pipeline systems may be used to convey any number of types of fluid ranging from petroleum products to natural gas. To monitor these systems different non-invasive techniques have been developed to identify anomalies and events that may put the functioning of the pipeline at risk. These techniques include visual observations, manual inspection, acoustic monitoring, thermographic infrared inspection methods, ground penetrating radar methods and hydraulic based techniques.

Visual observations include reporting by customers or by staff following the appearance of water or other fluids on a ground surface such as the ground. However, it is likely that if an anomaly is visible on the surface then the original damage happened at a previous time and was not identified and located in time to be avoided. Manual inspection techniques include the use of mechanical or electronic devices that perceive noise or vibrations that correspond to anomalies such as leaks. These monitoring techniques are usually also reactive and are usually not permanent because they depend on staff working around a suspected area to obtain results.

Acoustic monitoring has been previously shown to be effective with the installation of hydrophones or accelerometers around an area of interest. Depending on the level of complexity of the system and the available analysis tools, acoustic monitoring can be expensive in comparison to manual techniques and can only cover a short distance range around the measurement locations or area of interest. Similarly, thermographic methods also only cover a short range, are not a permanent monitoring method and are highly sensitive to environmental conditions at the timing of testing. On the other hand, ground penetrating radar techniques can provide an estimation of the location of a leak considering the effect that the leaked fluid such as water has on the soil. However, the testing is time consuming and is not suitable for undertaking permanent and continuous monitoring of a pipeline.

The hydraulic based techniques involve anomaly and event detection methods based on the understanding of the movement of a fluid along a pipeline and are typically related to the measurement and analysis of two hydraulic variables: flow (or velocity) and/or pressure of the fluid flowing in the pipeline. Several approaches have been adopted including:
  volume based methods;
  single point pressure analysis;
  statistical detection;
  inverse transient analysis; and
  transient-based methods.

However, while each of these approaches has been moderately successful depending on the assessment task they also have associated disadvantages. Some of these methods are only applicable for the detection of leaks. Volume based methods consider the computation of the difference between the flow going in and out of the pipeline system and the change of storage during that period of time. By finding the differences, it is possible to detect the occurrence of leaks or bursts in a system. This technique has been successfully applied in cases where there is appropriate instrumentation and an associated SCADA (Supervisory Control and Data Acquisition) system with an appropriate sampling rate. However, the use of these techniques is limited in most applications to steady state data and cannot provide a specific location for the anomaly.

Single point pressure analysis methods work based on the detection of an abnormally low pressure in the pipeline and the statistical processing of those pressures will then trigger an alarm. However, if these methods are not combined with others, it is not possible to obtain a location for the anomaly and given that they are based on steady-state pressure data, the alarms can be misleading when triggering off other changes in pressure that are normal. Similarly, statistical detection methods can use a range of variables to detect anomalies including flow, pressure or temperature. These methods use data from SCADA systems and are usually a combination between volume based and pressure point analysis. Sequential probability ratio tests are applied to the incoming data to determine if the overall condition of the system is abnormal. These methods are based on monitoring the long term or steady state variation of data collected from the system and as such the resolution of the data limits its ability to timely detect and locate anomalies.

Other methods, including inverse analysis, use numerical models in conjunction with measured data from the pipeline system. This method is known as an inverse method because the parameters or characteristics of the model are modified to match the results of the measurements. For the detection of leaks, the size of the leak and the leak location are variables which form inputs to a model and which are varied in an attempt to match the model predictions with measured pressure data. While this approach has been somewhat successful, it is generally extremely computationally intensive and as such requires the offline analysis of the measured pressure trace data before conclusions can be reached in relation to the occurrence of an anomaly.

A last group of methods is based on pressure transients. These transient-based methods have received more attention as they provide for the inspection of long sections of a pipe with a relatively simple system set up. These methods are based on the interpretation of the effect that the occurrence of an anomaly will have on a measured transient pressure trace. Visual analysis and processing of the transient pressure traces to identify reflections in the pressure traces have been used to detect the occurrence of leaks in pipelines. However, given the extensive numerical processing that is necessary, this method is not suitable for a real-time monitoring application. Attempts to reduce the processing time required to provide a result in these systems involve first having a detailed model of the pipeline system that is to be monitored. Detailed pipeline information can often be unavailable, especially for longstanding pipeline assets, and in any event the formulation of these detailed models requires significant expertise that is either not available or whose expense cannot be justified. Unfortunately, these delays in being able to determine the occurrence of an anomaly because of the requirement for offline analysis have real world consequences as this also defers the potential remediation of any issues that might be eventually determined as a result of the analysis.

Against this background, there is a need for a monitoring method and system capable of identifying anomalies and potentially their associated characteristics in real-time without requiring an accurate numerical model of the configuration of the physical pipeline system.

SUMMARY

In a first aspect, the present disclosure provides a method for real time monitoring of the condition of a pipeline, comprising:
 continuously monitoring transient pressure information of a fluid in the pipeline;
 selecting a time window of transient pressure information; and
 processing the time window of transient pressure information to detect an anomaly in the pipeline.

In another form, processing the time window of transient pressure information comprises:
 down sampling the time window of transient pressure information to generate a down sampled time window of pressure information; and
 processing the down sampled time window of transient pressure information by a classifier artificial neural network (ANN) trained to categorise a pipeline operating condition; and
 determining by the classifier ANN the pipeline operating condition for the time window.

In another form, the pipeline operating condition is categorised as a normal operating condition where no anomaly is present in the time window of transient pressure information or an abnormal pressure condition where an anomaly is present in the time window of transient pressure information.

In another form, the category of abnormal pressure condition is further categorised into a first abnormal pressure condition signifying only a presence of an anomaly in the time window of transient pressure information or a second abnormal condition where not only the presence of an anomaly is detected in the time window of transient pressure information but also that anomaly characteristics related to the anomaly in the time window of transient pressure information may be determined.

In another form, processing the time window of transient pressure information comprises:
 following determining that the time window of transient pressure information is categorised in the second abnormal condition; then
 processing the down sampled time window of transient pressure information by a first anomaly detector ANN trained to detect a first type of anomaly in the pipeline and to determine associated anomaly characteristics for the first type of anomaly; and
 verifying whether the first type of anomaly is detected in the time window of transient pressure information.

In another form, verifying whether the first type of anomaly is detected in the time window of transient pressure information comprises determining whether the determined associated anomaly characteristics are consistent with the pipeline.

In another form, determining whether the determined associated anomaly characteristics are consistent with the pipeline includes determining whether a location of the anomaly is consistent with a length of pipeline.

In another form, on determining that the determined associated anomaly characteristics are consistent with the pipeline, verifying whether the first type of anomaly is detected in the time window of transient pressure information further comprises:
 numerically generating a time window of theoretical pressure information based on the first anomaly type and associated anomaly characteristics;
 comparing the selected time window of transient pressure information as measured with the time window of theoretical pressure information as numerically generated to determine a comparison measure; and
 applying a comparison threshold to the comparison measure to indicate that the first type of anomaly is detected in the time window of transient pressure information.

In another form, on determining that the numerically generated time window of transient pressure information is partially consistent with the selected time window of transient pressure information the method further comprises:
 refining one or more anomaly characteristics to obtain a better match between the numerically generated time window of transient pressure information and the selected time window of transient pressure information.

In another form, on failing to verify that the first type of anomaly is detected in the time window of transient pressure information the method comprises processing the down sampled time window of transient pressure information by a second anomaly detector ANN trained to detect a second type of anomaly in the pipeline and to determine associated anomaly characteristics for the second type of anomaly.

In another form, processing the time window of transient pressure information comprises following determining that the time window of transient pressure information is categorised in the second abnormal condition then successively selecting a number of time windows of transient pressure information following in time from the selected time window of transient pressure information covering a predetermined time period and determining that all time windows are categorised in the second abnormal condition.

In another form, following processing of the time window of transient pressure information a further successive time window of transient pressure information is selected for processing in accordance with the method of the first aspect of the disclosure.

In another form, the types of anomaly include:
a leak in the pipeline;
a burst in the pipeline
a closure or opening of a valve in the pipeline; or
a non-characteristic flow event.

In another form, the associated anomaly characteristics include:
a location of the anomaly;
a physical size of the anomaly; or
a flow rate of liquid associated with the anomaly.

In another form, the classifier ANN is trained to categorise a pipeline operating condition by:
selecting a range of anomaly types and associated ranges of anomaly characteristics;
generating respective time windows of transient pressure information for the range of anomaly types and associated ranges of values of the anomaly characteristics;
down sampling the respective time windows of transient pressure information to form respective down sampled time windows of transient pressure information each having a size or dimension corresponding to the input dimension of the classifier ANN;
assigning a respective pipeline operating condition to each of the down sampled time windows of transient pressure information;
training the classifier ANN to determine the pipeline operating condition based on each of the down sampled time windows of pressure information and the assigned respective pipeline operating condition.

In another form, the anomaly detector ANN is trained to determine a respective anomaly type and associated anomaly characteristics by:
training the anomaly detector ANN to determine the respective anomaly type and associated anomaly characteristics based on each of the down sampled time windows of transient pressure information and their anomaly type and anomaly characteristics.

In another form, generating respective time windows of transient pressure information for the range of anomaly types and associated ranges of values of the anomaly characteristics includes numerically generating one or more of the respective time windows of transient pressure information based on a hydrodynamic model of the pipeline.

In another form, generating respective time windows of transient pressure information for the range of anomaly types and associated ranges of values of the anomaly characteristics includes basing one or more of the respective time windows of transient pressure information on historical pressure information.

In a second aspect, the present disclosure provides a system for real time monitoring of the condition of a pipeline, the system including:
a pressure detector for monitoring transient pressure information of a fluid in the pipeline;
an analysis module comprising one or more data processors for:
selecting a time window of transient pressure information; and
processing the time window of transient pressure information to detect an anomaly in the pipeline In another form, processing the time window of transient pressure information by the analysis module comprises:
down sampling the time window of transient pressure information to generate a down sampled time window of pressure information; and
processing the down sampled time window of transient pressure information by a classifier artificial neural network (ANN) trained to categorise a pipeline operating condition; and
determining by the classifier ANN the pipeline operating condition for the time window.

In another form, the pipeline operating condition is categorised as a normal operating condition where no anomaly is present in the time window of transient pressure information or an abnormal pressure condition where an anomaly is present in the time window of transient pressure information.

In another form, the category of abnormal pressure condition is further categorised into a first abnormal pressure condition signifying only a presence of an anomaly in the time window of transient pressure information or a second abnormal condition where not only the presence of an anomaly is detected in the time window of transient pressure information but also that anomaly characteristics related to the anomaly in the time window of transient pressure information may be determined.

In another form, processing the time window of transient pressure information by the analysis module comprises:
following determining that the time window of transient pressure information is categorised in the second abnormal condition; then
processing the down sampled time window of transient pressure information by a first anomaly detector ANN trained to detect a first type of anomaly in the pipeline and to determine associated anomaly characteristics for the first type of anomaly; and
verifying whether the first type of anomaly is detected in the time window of transient pressure information.

In another form, verifying whether the first type of anomaly is detected in the time window of transient pressure information comprises determining whether the determined associated anomaly characteristics are consistent with the pipeline.

In another form, determining whether the determined associated anomaly characteristics are consistent with the pipeline includes determining whether a location of the anomaly is consistent with a length of pipeline.

In another form, on determining that the determined associated anomaly characteristics are consistent with the pipeline, verifying whether the first type of anomaly is detected in the time window of transient pressure information further comprises:
numerically generating a time window of theoretical pressure information based on the first anomaly type and associated anomaly characteristics;
comparing the selected time window of transient pressure information as measured with the time window of theoretical pressure information as numerically generated to determine a comparison measure; and
applying a comparison threshold to the comparison measure to indicate that the first type of anomaly is detected in the time window of transient pressure information.

In another form, on determining that the numerically generated time window of transient pressure information is partially consistent with the selected time window of transient pressure information the method further comprises:

refining one or more anomaly characteristics to obtain a better match between the numerically generated time window of transient pressure information and the selected time window of transient pressure information.

In another form, on failing to verify that the first type of anomaly is detected in the time window of transient pressure information the method comprises processing the down sampled time window of transient pressure information by a second anomaly detector ANN trained to detect a second type of anomaly in the pipeline and to determine associated anomaly characteristics for the second type of anomaly.

In another form, processing the time window of transient pressure information comprises determining that the time window of transient pressure information is categorised in the second abnormal condition then successively selecting a number of time windows of transient pressure information following in time from the selected time window of transient pressure information covering a predetermined time period and determining that all time windows are categorised in the second abnormal condition.

In another form, following processing of the time window of transient pressure information a further successive time window of transient pressure information is selected for processing by the analysis module in accordance with the system of any one of claims 17 to 27.

In another form, the types of anomaly include:
a leak in the pipeline;
a burst in the pipeline
a closure or opening of a valve in the pipeline; or
a non-characteristic flow event.

In another form, the associated anomaly characteristics include:
a location of the anomaly;
a physical size of the anomaly; or
a flow rate of liquid associated with the anomaly.

In another form, the classifier ANN is trained to categorise a pipeline operating condition by:
selecting a range of anomaly types and associated ranges of anomaly characteristics;
generating respective time windows of transient pressure information for the range of anomaly types and associated ranges of values of the anomaly characteristics;
down sampling the respective time windows of transient pressure information to form respective down sampled time windows of transient pressure information each having a size or dimension corresponding to the input dimension of the classifier ANN;
assigning a respective pipeline operating condition to each of the down sampled time windows of transient pressure information;
training the classifier ANN to determine the pipeline operating condition based on each of the down sampled time windows of pressure information and the assigned respective pipeline operating condition.

In another form, the anomaly detector ANN is trained to determine a respective anomaly type and associated anomaly characteristics by:
training the anomaly detector ANN to determine the respective anomaly type and associated anomaly characteristics based on each of the down sampled time windows of transient pressure information and their anomaly type and anomaly characteristics.

In another form, generating respective time windows of transient pressure information for the range of anomaly types and associated ranges of values of the anomaly characteristics includes numerically generating one or more of the respective time windows of transient pressure information based on a hydrodynamic model of the pipeline.

In another form, generating respective time windows of transient pressure information for the range of anomaly types and associated ranges of values of the anomaly characteristics includes basing one or more of the respective time windows of transient pressure information on historical pressure information.

In a third aspect, the present disclosure provides a system for real time monitoring of the condition of a pipeline, the system including:
pressure detecting means for monitoring transient pressure information of a fluid in the pipeline;
data processing means configured for:
selecting a time window of transient pressure information; and
processing the time window of transient pressure information to detect an anomaly in the pipeline.

In a fourth aspect, the present disclosure provides a system for real time monitoring of the condition of a pipeline, the system including means to carry out the method of the first aspect of the disclosure.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
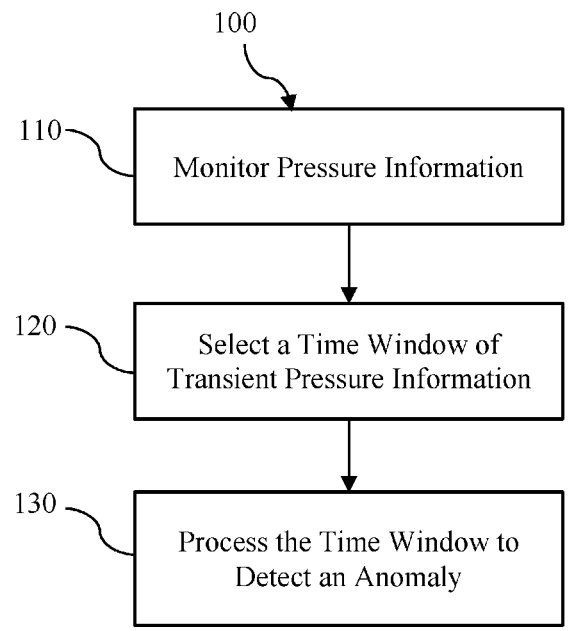
FIG. 1 is a flowchart of a method for real time monitoring of the condition of a pipeline in accordance with an illustrative embodiment.

Referring now to FIG. 1, there is shown a flowchart of a method 100 for real time monitoring of the condition of a pipeline according to an illustrative embodiment. As would be appreciated, the present method and system is applicable to any fluid carrying pipeline system or network including, but not limited to, water transmission pipes, pipelines in chemical plants, wastewater pumping pipelines or oil and gas pipelines.

In this example, the real time monitoring method 100 operates to detect an anomaly in the pipeline. Throughout this specification, the term "anomaly" is taken to mean a non-standard operation, functioning or characteristic of the pipeline. An anomaly may be classified under different types, including, but not limited to, a burst, a recently formed leak, the sudden closure or opening of a valve, an unusual high demand in the pipeline or the failure of a pump. Another example of an anomaly corresponding to a non-standard operation of the pipeline would be a fire fighting equipment test procedure where valves and pumps designed to provide water in the event of a fire are tested.

An anomaly may also involve characteristics that characterise the anomaly. As a non-limiting example, an anomaly may be of the type "burst" and the associated anomaly characteristics may include the location of the "burst", the size of the "burst" and the flow rate of fluid exiting the pipeline as a result of the "burst".

Throughout this specification the term "real time" when pertaining to the monitoring method and system of the present disclosure is taken to mean that the results of the method and system are presented substantially in real time, or near real time, as compared to the timing of the anomalies and further that the results do not require additional or further analysis conducted offline. It is understood that the term "real time" is not intended to require that the method and system provides results instantaneously. As a non-limiting example, a system in accordance with the present disclosure that provides results within a minute of the development of the anomaly would be comfortably within the definition of real time as this term is to be understood throughout this specification.

Figure 2:
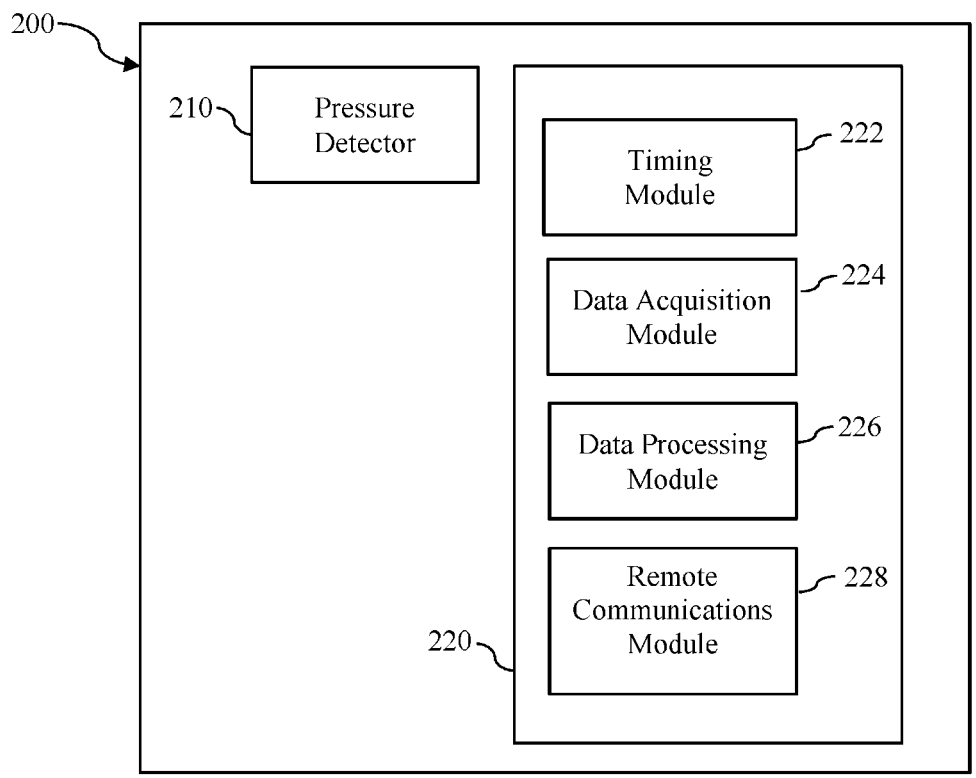
FIG. 2 is a system overview diagram of a system for real time monitoring of the condition of a pipeline in accordance with an illustrative embodiment.

At step 110, transient pressure information of a fluid in the pipeline is continuously monitored. Referring also to FIG. 2, there is shown a monitoring system 200 for monitoring the condition of a pipeline according to an illustrative embodiment operable to implement method 100. In this illustrative embodiment, monitoring system 200 includes a pressure detector or sensor 210 in the form of a pressure or acoustic transducer for monitoring or capturing the transient pressure information of the fluid in the pipeline in combination with an analysis module 220 for selecting and processing a time window of transient pressure information to detect the anomaly in the pipeline.

In terms of the pressure sensor 210, as would be appreciated, any type of high frequency response pressure detector, optical fibre sensor or transducer capable of measuring the fluid pressure on a real time basis and operating at a sampling rates typically varying between 100 Hz and 10,000 Hz for a given location may be used. The selection of a sampling frequency may depend on factors such as the pipe wall properties of the pipeline, the wave speed of the fluid and the expected speed of occurrence of the anomaly. In this illustrative embodiment, analysis module 220 includes a customised data logging and analysis arrangement comprising a timing module 222 or other clock arrangement which may be GPS based, a data acquisition module 224, data processing module 226 and a remote communications module 228 to convey detection results to a location when an anomaly has been detected in the pipeline.

At step 120, a time window of transient pressure information is selected. In one example, the duration of this time window covers at least 2 L/a seconds of the analysed pipeline where L is the length of the pipeline that is being monitored and a is the transient wave speed in the fluid. In another example, the duration of this time window may be selected to be longer than 2 L/a if the expected anomaly does not involve a near instantaneous change in pressure, eg in the case where there is a more gradual but abnormal change in pressure. In one example, the time window covers at least 2.5 L/a. In another example, the time window covers at least 3 L/a. In yet another example, the time window covers at least 3.5 L/a.

At step 130, the time window is processed in order to detect an anomaly in the pipeline.

Figure 3:
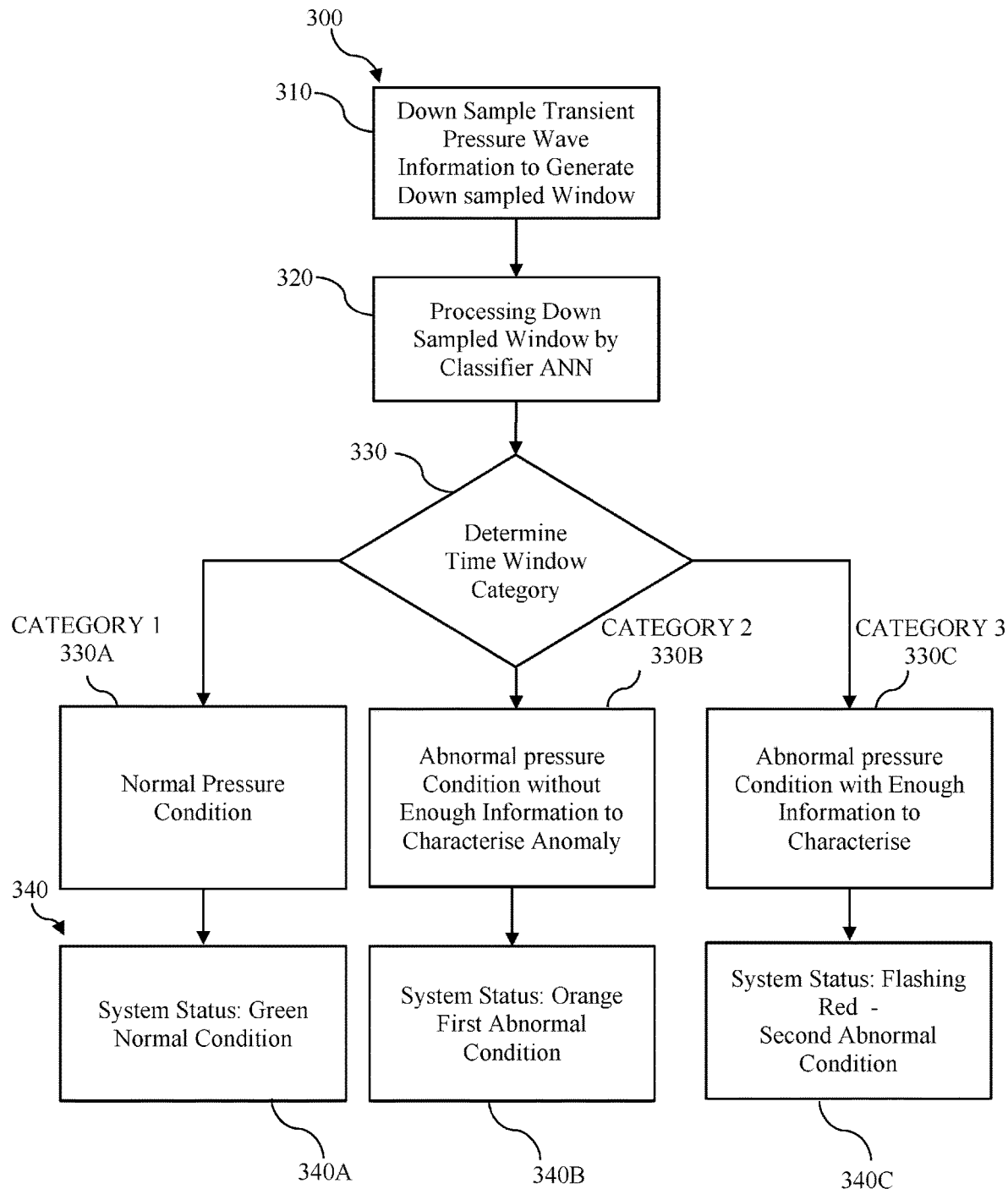
FIG. 3 is a flowchart of a method for processing a time window of transient pressure information in accordance with an illustrative embodiment.

Referring now to FIG. 3, there is shown a flowchart of a method 300 to process the time window of transient pressure information (ie, step 130 in FIG. 1) in accordance with an illustrative embodiment.

At step 310, the time window of transient pressure information which corresponds to a time dependent trace of the variation of transient pressure as a function of time as determined by a pressure sensor, typically sampled at a frequency of say 2,000 Hz, is down sampled to generate a down sampled time window of transient pressure information. As would be appreciated, depending on the pipeline setup, there may some pre-processing of the pressure information to address any background noise that may be present in the system.

The size or dimension of the down sampled time window is chosen to match the input size or dimension of the discrete time series required for analysis by one or more artificial neural networks (ANNs) as is explained in detail below. For the examples shown in this disclosure, the input size of the discrete time series corresponding to the time window of transient pressure information is 573 data points for a 2.5 L/a seconds sample which corresponds to a reduced sampling frequency of 256 Hz. The Applicant has discovered that adopting this reduced frequency of sampling greatly improves both the speed of training of the ANNs as well as the operation of the trained ANN on the input down sampled time window of transient pressure information allowing real time operation of the monitoring system.

In one example, the time window of transient pressure information may be down sampled to an equivalent down sampled sampling frequency using a uniform selection of the n-th sample of the time window of transient pressure information. The size of the resulting down sampled window of pressure information in this example depends on the size of the original transient pressure trace and the selected n.

In another example, the time window of transient pressure information may be down sampled to an equivalent down sampled sampling frequency by averaging the values of a n-th samples block into one value of pressure. In both this downsampling technique and the technique above, the sampling frequency and the frequency used for the training of the ANNs need to be related by an integer n.

In yet another example, the time window of transient pressure information may be down sampled to an equivalent down sampled sampling frequency by defining a new sample grid that matches the one used for the training and operation of the ANN. In this downsampling technique, the pressure value in the new grid is calculated by interpolation (eg, linear, quadratic, cubic, Gaussian, nearest neighbour, etc.). By using this technique, the downsampling frequency (eg, selecting every n-th sample or averaging over every n-th sample block or grouping) does not need be explicitly related to the frequency used for training the ANN by an integer factor. This method of downsampling was adopted for the examples discussed in this disclosure.

The final size of the down sampled pressure information and therefore, the size of the input for the ANN may be selected depending on the desired resolution for the identification of the features. As would be appreciated, there is a trade-off between the equivalent down sampled sampling frequency of the down sampled time window and the computational time required to develop the training and testing of the ANN. A larger input data set for the ANN will require in general more time to train; however, the testing time is not affected to the same extent.

In one example, the down sampled sampling frequency is selected from the following ranges, including, but not limited to: greater than 200 Hz, 200 Hz-250 Hz, 250 Hz-300 Hz, 300 Hz-350 Hz, 350 Hz-400 Hz, 400 Hz-450 Hz, 450 Hz-500 Hz, greater than 500 Hz, 500 Hz-550 Hz, 550 Hz-600 Hz, 600 Hz-650 Hz, 650 Hz-700 Hz, 700 Hz-750 Hz, 750 Hz-800 Hz, 800 Hz-850 Hz, 850 Hz-900 Hz, 900 Hz-950 Hz, 950 Hz-1 kHz, greater than 1 kHz, 1 kHz-1.05 kHz, 1.05 kHz-1.1 kHz, 1.1 kHz-1.15 kHz, 1.15 kHz-1.2 kHz, 1.2 kHz-1.25 kHz, 1.25 kHz-1.3 kHz, 1.3 kHz-1.35 kHz, 1.35 kHz-1.4 kHz, 1.4 Hz-1.45 kHz, 1.45 kHz-1.5 kHz, greater than 1.5 kHz, 1.5 kHz-1.55 kHz, 1.55 kHz-1.6 kHz, 1.6 kHz-1.65 kHz, 1.65 kHz-1.7 Hz, 1.7 kHz-1.75 kHz, 1.75 kHz-1.8 kHz, 1.8 kHz-1.85 Hz, 1.85 kHz-1.9 kHz, 1.9 kHz-1.95 kHz, 1.95 Hz-2 kHz, or greater than 2 kHz.

In other examples, the ratio of the down sampled sampling frequency to the detection sampling frequency is selected from the following ranges, including, but not limited to: 0.04-0.1, 0.1-0.15, 0.15-0.2, 0.2-0.25, less than 0.25, 0.25-0.3, 0.3-0.35, 0.35-0.4, 0.4-0.45, 0.45-0.50, less than 0.5, 0.5-0.55, 0.55-0.6, 0.6-0.65, 0.65-0.7, 0.7-0.75, less than 0.75, 0.75-0.8, 0.8-0.85, 0.85-0.9 or 0.9-0.95.

At step 320, the down sampled pressure information is processed by an initial classifier ANN trained to categorise the pipeline operating condition and in this example functions to determine whether an anomaly has occurred in the time window of transient pressure information under analysis and to determine if the information contained in the time window is enough to locate and characterise the anomaly. In this example, the classifier ANN is trained with data corresponding to normal pressure conditions in a pipeline and over the other types of anomaly that are of interest which in this example include, but are not limited to, a burst, a recently formed leak, the sudden closure or opening of a valve, a fire-fighting test or fire-fighting event, an unusually high demand in the pipeline or the failure of a pump.

At step 330, and in one example, the pipeline operating condition is categorised. In one example, one of the categories indicates a normal operating condition of the pipeline (eg, CATEGORY 1 at 330A) and another category indicates an abnormal condition of the pipeline where there is an anomaly in the time window (eg, CATEGORY 2 at 330B). In a further example, the category of abnormal pressure condition is further categorised to include a first abnormal pressure condition signifying only the presence of an anomaly in the time window (eg, CATEGORY 2 at 330B) and a second abnormal condition where not only the presence of an anomaly is indicated but also that the anomaly characteristics related to the anomaly may be determined (eg, CATEGORY 3 at 330C)

In one example, at step 340 a system monitoring status is generated depending on the category that has been determined and corresponding to the pipeline operating condition category. In an embodiment, the system monitoring status is a visual indicator which is determined to be "Green" (at 340A) corresponding to normal operating conditions (ie CATEGORY 1) and "Orange" (at 340B) corresponding to the first abnormal pressure condition (ie, CATEGORY 2) signifying only the presence of an anomaly in the time window and flashing "RED" (at 340C) corresponding to the second abnormal condition where not only the presence of an anomaly is indicated but also that the anomaly characteristics related to the anomaly may be determined (ie, CATEGORY 3). As would be appreciated, the system status may correspond to any indicator (eg, audible, visual or tactile) signifying the operating condition of the pipeline based on the categorisation carried out by the classifier ANN.

In one example, the time window of transient pressure information is determined to be in CATEGORY 2 corresponding to the first abnormal condition because the time window does not contain a sufficient amount of information following the occurrence of the anomaly in order to determine the characteristics. In one example, at least 2 L/a seconds of pressure information are required after the occurrence of the anomaly for determining the related anomaly characteristics. Considering that the selection of time windows of transient pressure information is sequential following the occurrence of the anomaly there will be an initial group of time windows where an anomaly is indicated but which do not contain at least 2 L/a seconds of pressure information following the anomaly to allow the anomaly characteristics to be determined and these time windows are categorised as CATEGORY 2 with in one example a system status corresponding to "Orange".

In this manner, method 300 operates as a first threshold monitoring system for detection of the presence of an anomaly prior to the determination of the anomaly type and any associated anomaly characteristics. As would be appreciated, a real time threshold anomaly monitoring system that determines that an anomaly has occurred will provide important information about the condition of a pipeline and may be used as a first coarse filter to decide when a deeper analysis is required.

The Applicant has discovered that by establishing this first threshold in the monitoring system, it is possible to generate a preliminary alert system based on the pressure status of the pipeline. If the result from step 330 is to categorise the time window of transient pressure information as CATEGORY 1 (330 A), the pipeline pressure status is normal (represented in this example with the system status "Green") and the next time window can be tested. If the result from step 330 is to classify the time window of transient pressure information as CATEGORY 2 (330 B), the pipeline pressure status is abnormal (represented by system status "Orange"), however, there is not enough information in that time window to conduct further analysis. Finally, if the result from step 330 is to classify the time window of transient pressure information as Category 3 (330 C) the pipeline pressure status is abnormal but with enough information to process (represented by system status of flashing "Red") to determine the associated anomaly characteristics.

In this manner, method 300 operates as a first threshold real time monitoring system for detection of an anomaly prior to the determination of the anomaly type and any associated anomaly characteristics. As would be appreciated, a real time threshold anomaly monitoring system that determines that an anomaly has occurred, or is occurring, will provide important information about the condition of a pipeline and may be used as a first coarse filter to implement potential corrective action.

Figure 4:
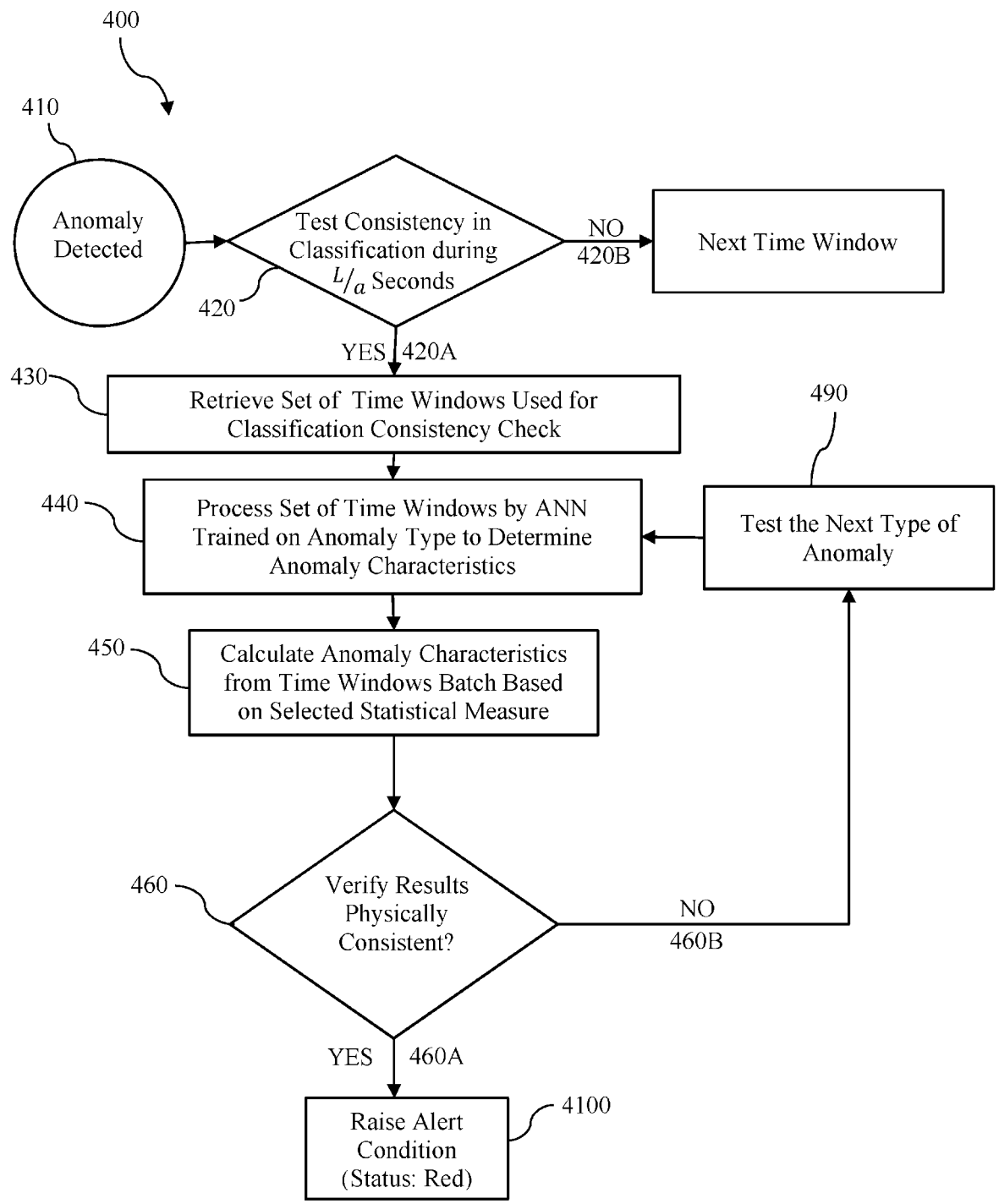
FIG. 4 is a flowchart of a method for processing a time window of transient pressure information to determine a type of anomaly and its characteristics in accordance with an illustrative embodiment.

Referring now to FIG. 4, there is shown a flow chart of a method 400 for processing a time window of transient pressure information to determine a type of anomaly and associated anomaly characteristics according to an illustrative embodiment.

At step 410, in this example an anomaly has first been detected by the first classifier ANN and the time window of transient pressure information has been classified as abnormal with enough information to locate and characterise and anomaly (see CATEGORY 3 in FIG. 3). The next task is to then determine the type of anomaly and any associated anomaly characteristics. In another example embodiment, the initial threshold determination that an anomaly has occurred is carried out and the monitoring method proceeds to detect different types of anomalies and their associated characteristics.

At step 420, in this example, an optional classification consistency test is carried out to verify that the classification in CATEGORY 3 is maintained for successively selected time windows of transient pressure information corresponding to a predetermined time period following the time window where CATEGORY 3 was first indicated. In one embodiment, the predetermined time period is at least L/a seconds. In another example, the predetermined time period is at least 15 L/a seconds. In yet another example, the predetermined time period is at least 2 L/a seconds. This consistency test can assist in avoiding processing pressure information from misclassified time windows.

In one example, and as described below, the anomaly characteristics may be computed from the group of time windows of pressure information that have been classified as CATEGORY 3 in the consistency test and not based on the classification of only one time window of transient pressure information. In this manner, if the classification as CATEGORY 3 has not been continuous for at least L/a seconds (ie, Condition "NO" 420B) following the first time window that was classified in CATEGORY 3, then the next successive time window is then analysed as depicted in FIG. 3. If the classification in CATEGORY 3 has been consistent during at least L/a seconds, the process of identification then continues with the current time window of transient pressure information (i.e. Condition"YES" 420A).

At step 430, the pressure information of the set of down sampled time windows corresponding to at least L/a seconds after the time window initially identified at step 410 are retrieved. As noted above, this set of time windows corresponds to those that satisfied the classification consistency check. These time windows will provide additional information to first anomaly detector ANN to determine the location and characteristics of the first type of anomaly. This step does not affect the near real time nature of the method and system proposed because the additional values for L/a seconds are usually not significant.

At step 440, the set of down sampled windows of transient pressure information is processed using the first anomaly detector ANN which is configured to detect and determine the anomaly characteristics of a first type of anomaly from a number of different types of anomalies that are under consideration. This process will then produce anomaly characteristics for each time window based on the type of anomaly being tested for.

At step 450, the system and method of the present disclosure proceeds to calculate the characteristics of the anomaly based on the results obtained from the ANN in the batch of time windows from step 440. This calculation is carried out by defining a statistical measure to obtain a combined result from all the analysed time windows. The Applicant has found that calculating the anomaly characteristics from multiple successive time windows that have been classified in CATEGORY 3, ie, an abnormal condition with enough information (ie, Status: "Red") can improve the results when compared to determining the presence of an anomaly and the associated anomaly characteristics from only one time window which has been classified in CATEGORY 3.

In one example, the statistical measure may be the average of the values for the anomaly characteristics obtained in step 440. In another example, the statistical measure may be the absolute mean of the values for the anomaly characteristics. In yet another example, the statistical measure may be the median of the values for the anomaly characteristics. This last statistic was selected for the examples shown in the present disclosure.

As would be appreciated, in another embodiment the method and system of the present disclosure may be applied to single time window that has been categorised and which is not subject to a consistency check and further where the first and subsequent anomaly detector ANNs only processes this single time window to determine the anomaly type and associated anomaly characteristics.

At step 460, a first physical consistency check or test is carried out to determine whether the determined anomaly characteristics are consistent with the physical parameters of the pipeline. In one example, the anomaly characteristic is the location of the anomaly and this can be checked to determine whether the location is actually physically within the length of the pipeline. In another example, where the anomaly characteristic is a flow rate, the determined flow rate may exceed any potential flow rate that could actually occur in the actual physical pipeline for the anomaly that is being analysed. If one or more of the determined anomaly characteristics are not consistent with pipeline (ie, Condition "NO" 460B) then the next type of anomaly is chosen at step 490 and the process is repeated at step 440 based on an ANN which is configured to detect and determine the anomaly characteristics of a second type of anomaly. This process may be repeated for all types of anomalies that are being considered for the pipeline by the adoption of subsequent anomaly detector ANNs.

In this manner, failure of the physical consistency test will indicate that the wrong anomaly type is being sought to be identified, ie, that the anomaly detector ANN trained for a particular type of anomaly is only identifying associated non-physical anomaly characteristics because the actual anomaly of the pipeline is not the type of anomaly that the anomaly detector ANN is configured to determine.

If the determined anomaly characteristics are at least consistent with the physical parameters or configuration of the pipeline (eg, location of anomaly is within the pipeline), ie, Condition "YES" 460A, then in accordance with an embodiment an alert condition is raised at step 4100 indicating that the correct anomaly type and associated anomaly characteristics have been identified (ie, Status: Red).

Figure 33:
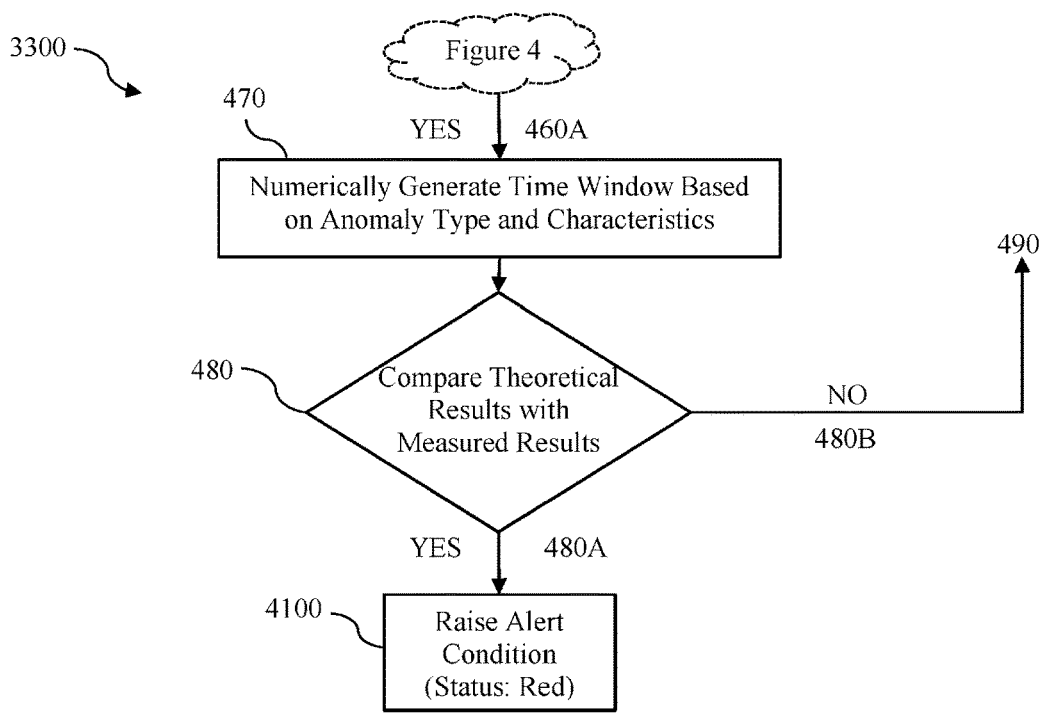
FIG. 33 is a flowchart of a further verification check following on from the physical consistency check referred to in FIG. 4 in accordance with an illustrative embodiment.

Referring now to FIG. 33, there is shown a flowchart of a further verification procedure 3300 following on from the physical consistency check referred to in FIG. 4 according to an illustrative embodiment. Picking up from a successful physical consistency step at condition YES 460A as shown in FIG. 4, verification procedure includes at step 470 numerically generating a transient pressure trace of theoretical pressure information using a hydrodynamic model of the pipeline based on the anomaly characteristics as determined by the anomaly detector ANN and the type of anomaly that the respective anomaly detector ANN is trained to recognise.

At step 480, the transient pressure trace of the theoretical pressure information as generated in accordance with a hydrodynamic model of the pipeline is compared to the pressure information as measured to determine a comparison measure. In one example, the comparison measure may be based on comparing whether the time location of features in the numerically generated time window of transient pressure information are within a predetermined error range with respect to similar features in the measured time window of transient pressure information. In one example, the time derivative is taken of both the measured and numerically generated time windows of the transient pressure information to emphasize the time location of features in both pressure traces for comparison purposes (eg, see FIG. 29). This approach recognises that significant changes in the pressure information are directly related to the location of the anomaly.

In another example, the comparison measure may be based on a comparison between the profiles in both the measured and numerically generated time windows of the transient pressure information to determine whether the determination of other anomaly characteristics besides anomaly location have been properly determined. In one embodiment, the comparison measure is determined by calculating the differences between the measured pressure value and the numerically generated pressure value at the corresponding time value for all time values and then determining the root mean square (RMS) summation of these differences. This comparison measure may then be compared with a comparison threshold.

In another example, the comparison measure could include the computation of the absolute error between the two windows of pressure, the value of the maximum error or any other comparison measure. In another example embodiment, the frequency distribution of errors is used to compare the time window of numerically generated pressure information with the measured pressure information to determine if the results provided by the anomaly detector ANN are accurate.

If as a result of the comparison it is determined that the numerically generated time window of transient pressure information is inconsistent with the measured time window (ie, Condition "NO" 480B) then the next type of anomaly is chosen at step 490 (see FIG. 4) and the process is repeated at step 440 based on an ANN which is configured to detect and determine the anomaly characteristics of a second type of anomaly. If on the other hand, the numerically generated and measured time window are determined to be consistent, ie, Condition "YES" 480A, then an alert condition is raised at step 4100 indicating that the correct anomaly type and associated anomaly characteristics have been identified (ie, Status: Red).

Figure 34:
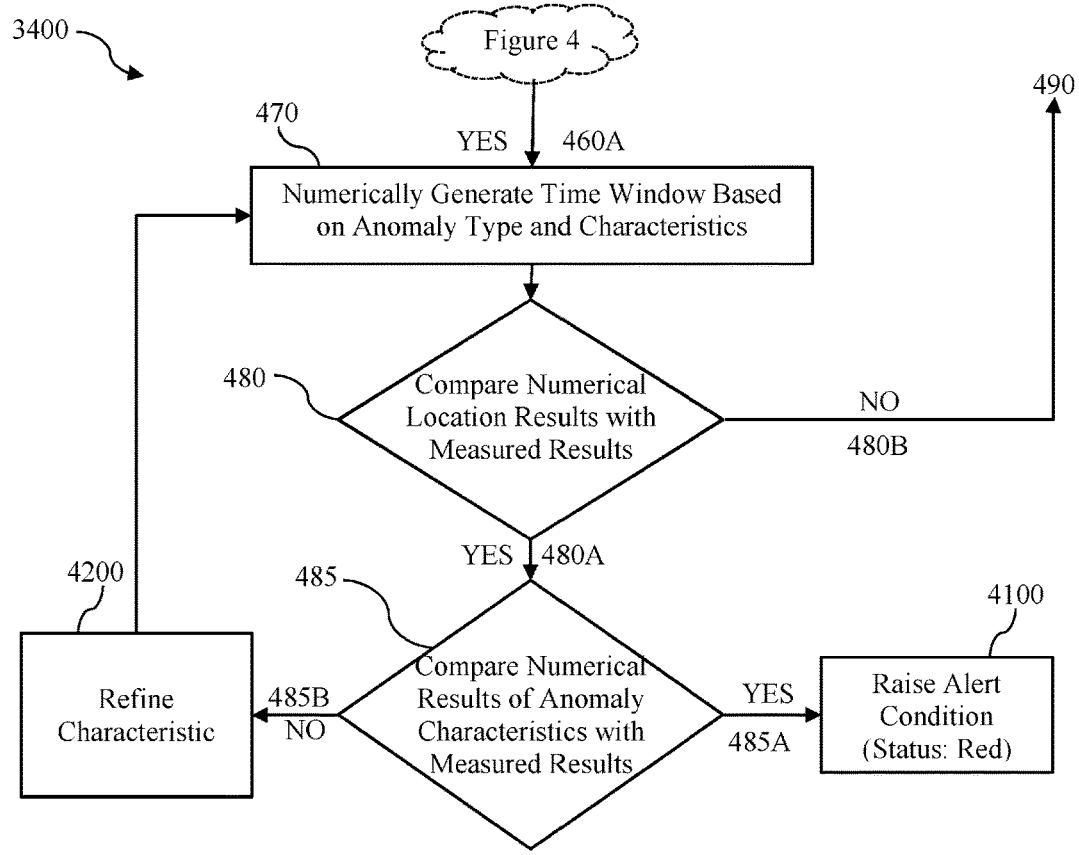
FIG. 34 is a flowchart of verification and associated refinement procedure 3400 following on from the physical consistency check referred to in FIG. 4 according to an illustrative embodiment.

Referring now to FIG. 34, there is shown a flowchart of a verification and associated refinement procedure 3400 following on from the physical consistency check referred to in FIG. 4 according to an illustrative embodiment. Procedure 3400 is similar to the verification procedure shown in FIG. 33 but adds a further refinement step to refine the determination of the anomaly characteristics as originally determined by the anomaly detector ANN. Once again, picking up from a successful physical consistency step at Condition "YES" 460A as shown in FIG. 4, verification and refinement procedure includes at step 470 numerically generating a transient pressure trace of theoretical pressure information using a hydrodynamic model of the pipeline based on the anomaly characteristics as determined by the anomaly detector ANN and the type of anomaly that the respective anomaly detector ANN is trained to recognise.

At step 480, the transient pressure trace of the theoretical pressure information as generated in accordance with a hydrodynamic model of the pipeline is compared to the pressure information as measured to determine a comparison measure. In this case, the comparison measure is based on comparing whether the time location of features in the numerically generated time window of transient pressure information are within a predetermined error range with respect to similar features in the measured time window of transient pressure information. As described previously, in one example the time derivative may be taken of both the measured and numerically generated time windows of the transient pressure information to emphasize the time location of features in both pressure traces for comparison purposes (eg, see FIG. 29).

If as result of the feature location comparison at step 480 it is determined that the numerically generated time window of transient pressure information is inconsistent with the measured time window (ie, Condition "NO" 480B) then the next type of anomaly is chosen at step 490 (see FIG. 4) and the process is repeated at step 440 based on an ANN which is configured to detect and determine the anomaly characteristics of a second type of anomaly. If on the other hand, the numerically generated and measured time window are determined to be consistent, ie, Condition "YES" 480A, then an additional comparison is carried out at step 485, where the comparison measure is based on a comparison between the feature profiles in both the measured and numerically generated time windows of the transient pressure information, to determine whether the determination of other anomaly characteristics besides the anomaly location have been properly determined.

If as result of the additional anomaly characteristic comparison at step 480 it is determined that the numerically generated time window of transient pressure information is partially consistent with the measured time window (ie, Condition "NO" 485B) then at step 4200, one or more of the anomaly characteristics are refined or modified and the process then reverts to step 470 to numerically generate a transient time window based this time on the refined or modified characteristics and the comparison process is repeated. If on the other hand, the numerically generated and measured time window are determined to be consistent, ie, Condition "YES" 485A, then an alert condition is raised at step 4110 indicating that the correct anomaly type and associated anomaly characteristics have been identified (ie, Status: Red).

With respect to the verification and refinement process 3400, the Applicant has found that the present method is often accurate in terms of the prediction of the location of a given anomaly but other anomaly characteristics may need further correction. In one example, the refinement process involves an iterative exploration over a range of possible values that the anomaly characteristic may adopt and then determining which value provides the best fit between the numerically generated and measured pressure traces.

In this manner, a cascading series of different ANNs trained for different types of anomalies may be applied to the down sampled time windows or transient pressure information that has been measured. As would be appreciated the ordering of different ANNs may be selected depending on the expected type of anomaly with the initial ANNs being trained to recognise and classify the most common types of anomalies expected for a given pipeline configuration.

As the pipeline condition monitoring methods of the present disclosure employ ANNs it is instructive to provide a general review of this topic.

Figure 5:
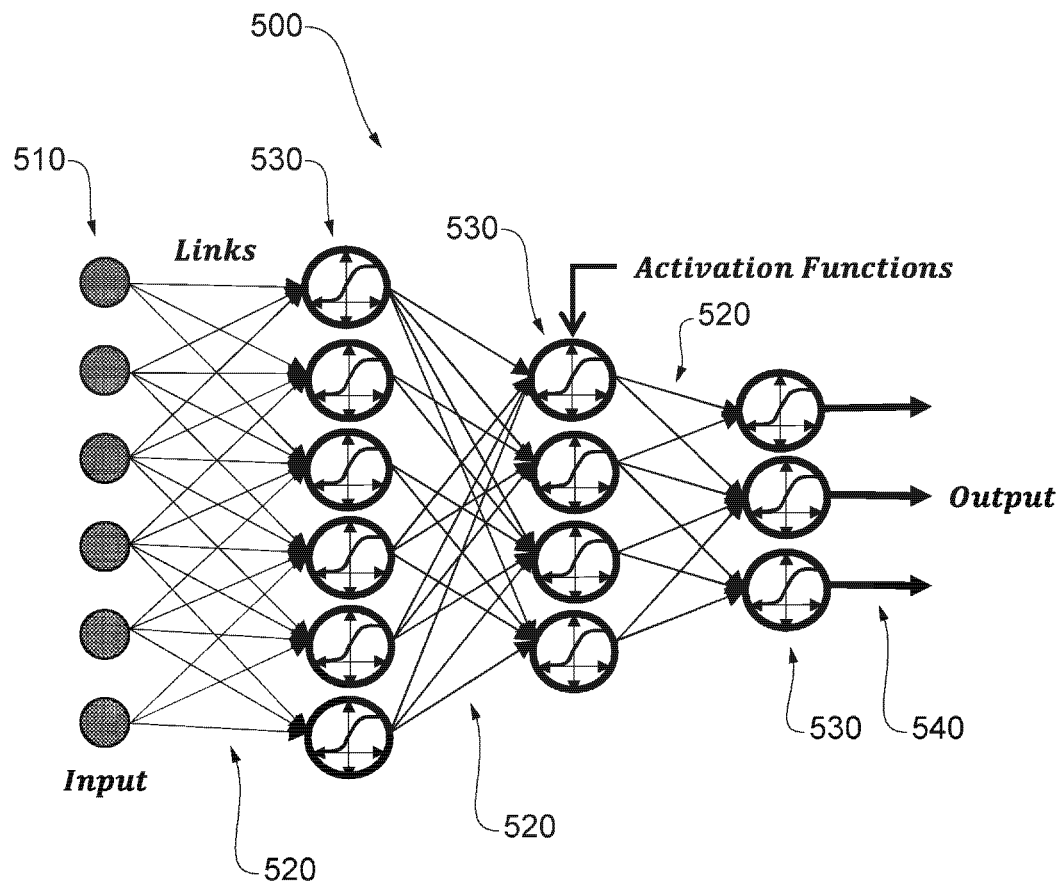
FIG. 5 is a system overview diagram of a generalised artificial neural network (ANN)

Referring now to FIG. 5, there is shown is a system overview diagram of a generalised ANN 500, where it can be seen that the ANN implements a mathematical function (model) from n inputs 510 to m outputs 540 where this function is represented by a mathematical graph of connections and nodes linking the inputs 510 to the outputs 540.

In this example, the inputs 510 to the generalised ANN 500 are a vector or series of numerical values where these values are transmitted via the links 520 of the graph to activation functions 530. All links 520 in the graph have an associated weight which is used to scale the value that traverses the link 520. Each activation function 530 transforms the sum of the weighted values it receives to an output value that is then propagated through the network. In this manner, the input values 410 are transformed by traversing the weighted links 520 and the activation functions 530 in the graph until they reach the output values 540.

ANNs are trained by a process that modifies the weight associated with each link 520 in the generalised ANN 500 to improve the accuracy of the model represented by the ANN 500. In theory, with modification of weights alone, it is possible for a network of at least three layers as depicted in FIG. 5, with enough links 520. to approximate any arbitrary function. However, the extent to which this theoretical position is achieved will in practice be determined by the interaction between the network architecture and the training process.

The ANN is trained by a process of mathematical regression where a gradient search algorithm is used to adjust the weights in the generalised ANN 500 to minimise the error between the actual outputs 540 of the network and the desired output. To be useful in the desired application domain, a network will approximate the required function to a high level of accuracy on both the data it was trained with and any new test data that it is presented with. As would be appreciated, the design of any ANN presents the model designer with a very broad range of design decisions relating to topology, scale, activation functions, regularisation strategies and training methodology. An important consideration is that the ANN should capture the behaviour of the desired function without having too many weights (parameters) which can then result in the over-fitting of the data used in the training process.

As will be described below, a feature of the analysis methods and systems of the present disclosure is that fast and accurate monitoring of pipeline condition may be carried out employing standard computer processing power such as would be possessed by a standard laptop computer. A non-limiting example of a suitable laptop computer that could be adopted would comprise 8 GB of RAM, an Intel™ i5 processor and 250 GB of storage. As referred to above, each measurement station consisting of a pressure detector and associated data processor is configured to record pressure information at a sampling rate between 100 Hz and 10,000 Hz.

Figure 6:
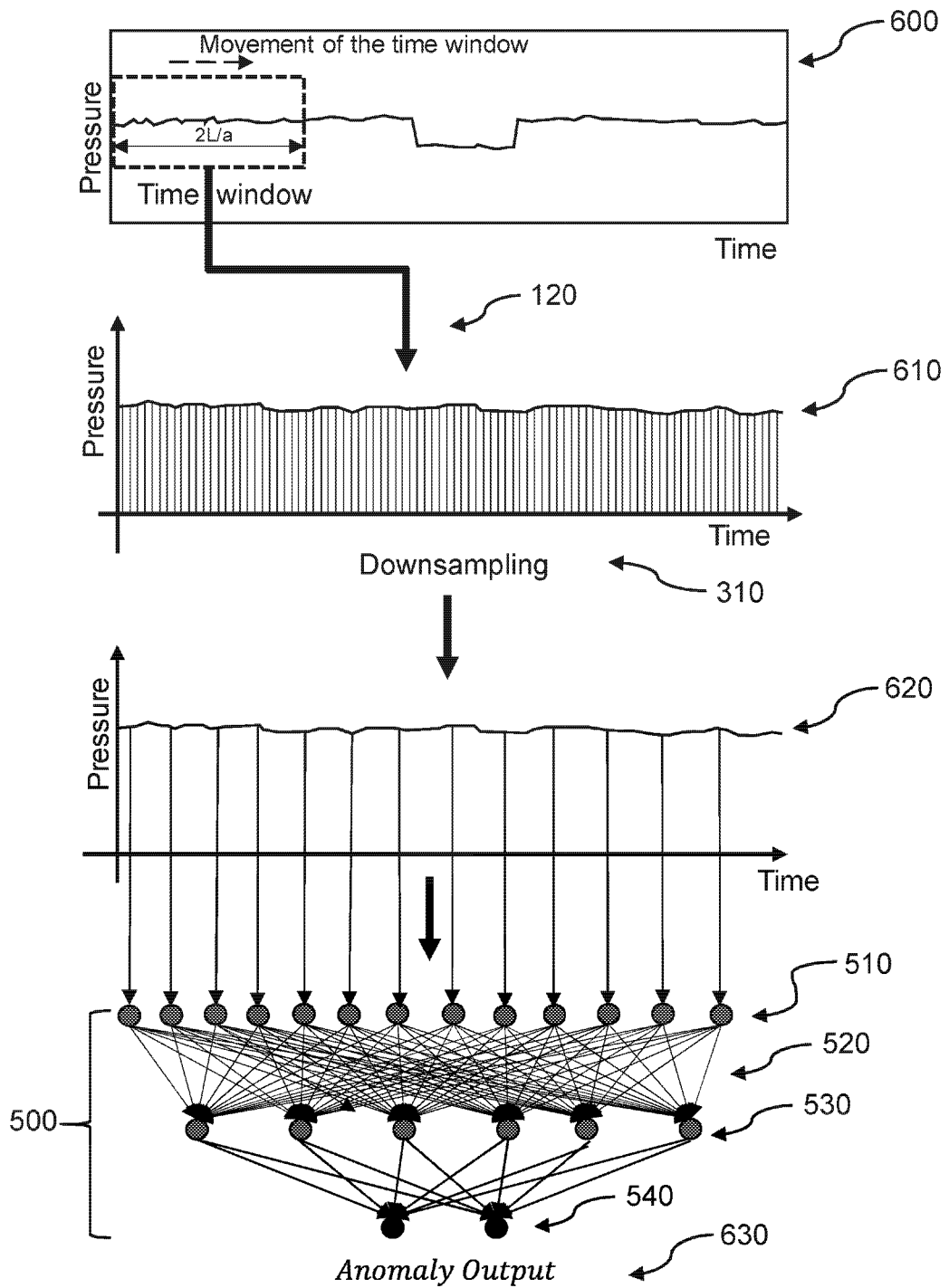
FIG. 6 is a data flow diagram of a method for real time monitoring of the condition of a pipeline adopting the ANN illustrated in FIG. 5 in accordance with an illustrative embodiment.

Referring now to FIG. 6, there is shown a data flow diagram showing figuratively the application of an ANN for the real time monitoring of the condition of a pipeline as has been discussed above. Plot 600 depicts the transient pressure information as determined by the pressure sensor as measured in real time at sampling rates of between 100 Hz and 10,000 Hz which, as depicted in plot 600, appears effectively as a continuous transient pressure trace.

A time window of this transient pressure information is selected (eg, see step 120 in FIG. 1) and this time window is shown in plot 610 which is on an expanded time base and shows the individual sampled pressure data points. In this example, the time window has a duration of at least 2 L/a seconds to ensure that the whole pipeline is being analysed. In accordance with the present disclosure, the time window of transient pressure information is down sampled to generate the down sampled time window shown in plot 620 (eg, see step 310 in FIG. 3) which is then used as an input vector 510 for an ANN with the general structure 500 (see FIG. 5). This ANN processes the input vector 510 corresponding to a series of transient pressure values to provide outputs 540 which in this illustrative embodiment corresponds to the occurrence of the anomaly in the analysed time window of the type that the ANN is trained to classify and in this example the anomaly characteristic being the location of the anomaly (eg, see step 450 of FIG. 4). As shown in FIGS. 1, 3 and 4, the process is executed in real time for each time window.

Following processing of the time window a further successive time window of transient pressure information is then selected for processing. Considering plot 600, this can be envisaged in one example as the position of the time window with respect to plot 600 remaining constant and the pressure wave information continually being updated and moving right to left with time. For a series of measured data, a new time window of transient pressure information is selected by adding the next available data point to the current time window of transient pressure information and eliminating the first data point of the current time window of transient pressure information. In this way, the complete measured transient pressure trace is divided and covered by the time windows.

Figure 7:
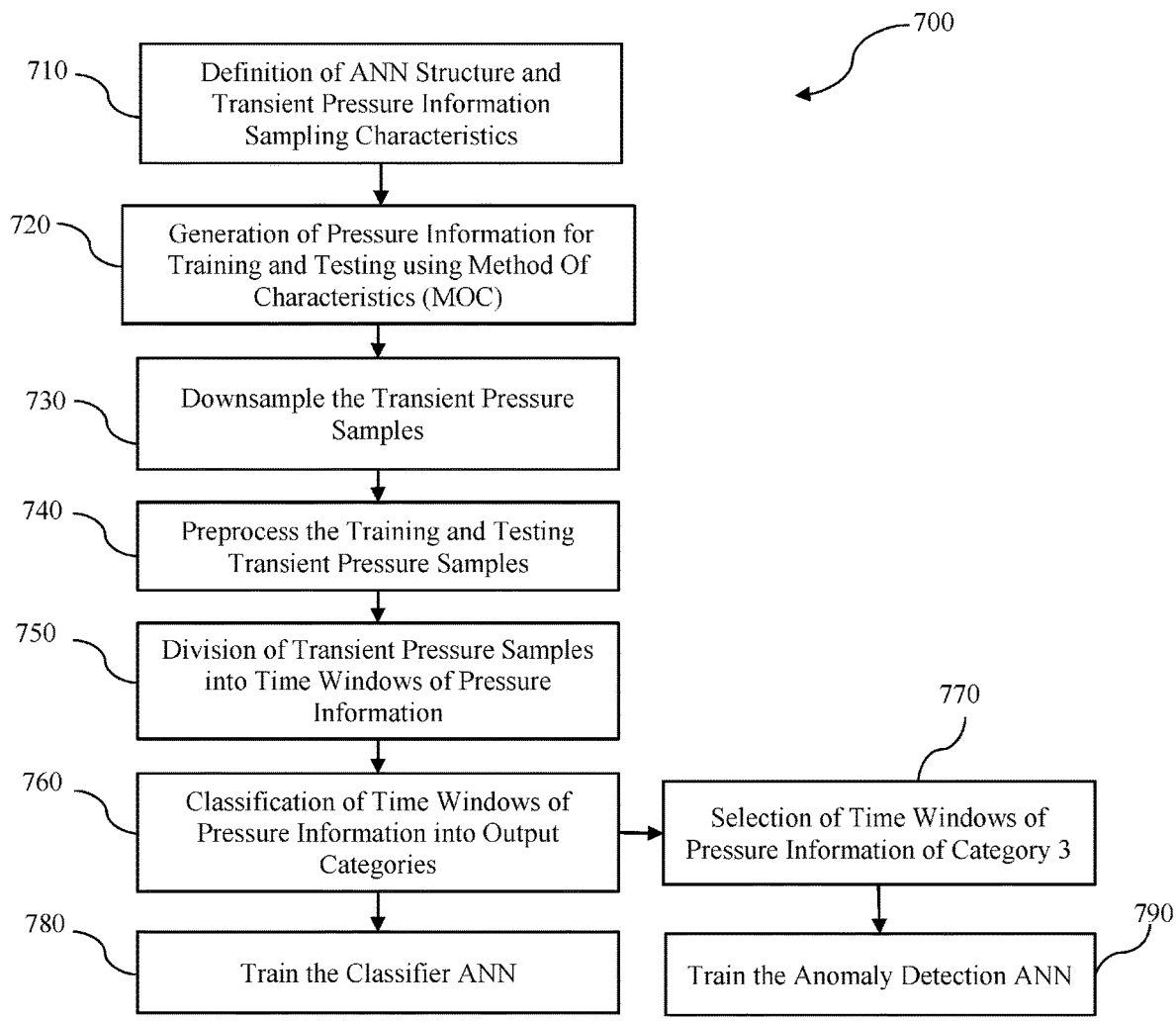
FIG. 7 is a flowchart of a method for training a classifier ANN and an anomaly detector ANN to classify the operating condition of a pipeline and to identify the occurrence of anomalies in accordance with an illustrative embodiment.

Referring now to FIG. 7, there is shown a flowchart of a method 700 for training a classifier ANN and an anomalous detector ANN according to an illustrative embodiment. By way of overview, at step 710, the characteristics of the ANN are defined including the ANN architecture and the input generation parameters such as the number of samples for training and testing. Additionally, the spatial distribution or sampling characteristics of the pressure information values along the pipeline are defined. At this stage an anomaly type and an associated range of values of the anomaly characteristics are selected that cover the possible range of physical situations being monitored for. For a particular example, the transient pressure samples are generated numerically. In another example, the pressure samples may be collected from historical data available from the pipeline in the form of measured historical transient pressure information associated with a known anomaly. In another example, these pressure sample data may be a combination of numerically generated transient pressure traces and available historical data.

At step 720, in one particular example, the training samples and the testing samples are generated numerically by a computational hydrodynamic model of the pipeline employing the Method of Characteristics (MOC). As will be discussed below, this method transforms the two hyperbolic partial differential equations that govern the behaviour of unsteady flow into four ordinary differential equations in order to obtain the variation of flow and head in a pipeline in time. These samples correspond to a set of transient pressure information or pressure traces that have been numerically generated that cover the different types of anomalies and the range of values of the associated anomaly characteristics.

A number of other numerical methods for generating the transient pressure information could also be used. Examples of these methods, in the time domain, include Skalak's model, or the Lagrangian method. In addition, any existing numerical method for solving hyperbolic partial differential equations can be applied to the method and system of the present disclosure. Other examples for generating the transient pressure information include implicit methods (which include the transformation of the partial differential equations to make them more flexible) or methods in the frequency domain such as the transfer matrix method or the Laplace domain admittance matrix.

At step 730, once the traces of transient pressure information have been numerically generated, they are then down sampled to match the input size or dimension of the ANN. At step 740, in one embodiment the down sampled numerical transient pressure traces undergo a further non-dimensional transformation which allows the ANN to determine results for any pipeline regardless of its dimensions. In general, to obtain a non-dimensional form of the pressure information, the following equation is used:

$$P^* = \frac{P - P_0}{\Delta P_i}$$

where P* is the non-dimensional transient pressure, $P_0$ is the initial steady state pressure at the measurement point and $\Delta P_i$ is the initial pressure increase after the generation of any transient pressure wave associated with the anomaly.

The initial steady state pressure and the initial pressure increase may be easily extracted either from the numerically generated pressure information or from the transient pressure measurements. Determining these two values of pressure does not require any extra information about the pipeline system. On the other hand, to transform the time to a non-dimensional form, the following equation is used:

$$t^* = \frac{t}{2L/a}$$

where t* is the non-dimensional time and 2 L/a corresponds to the time that it takes for the generated transient pressure wave to travel to the reservoir connected to the pipeline and back again. As referred to previously, L is the length of the pipeline and a is the wave speed of the fluid in that pipeline.

These two values of L and a may not be known. However, if this information is not available, the non-dimensional transformation can be obtained directly from the measured transient pressure information since the reflection from the reservoir is always evident in the pressure signal. In a similar way, to complete the transformation, the size of anomaly may also be non-dimensionalised.

Figure 8:
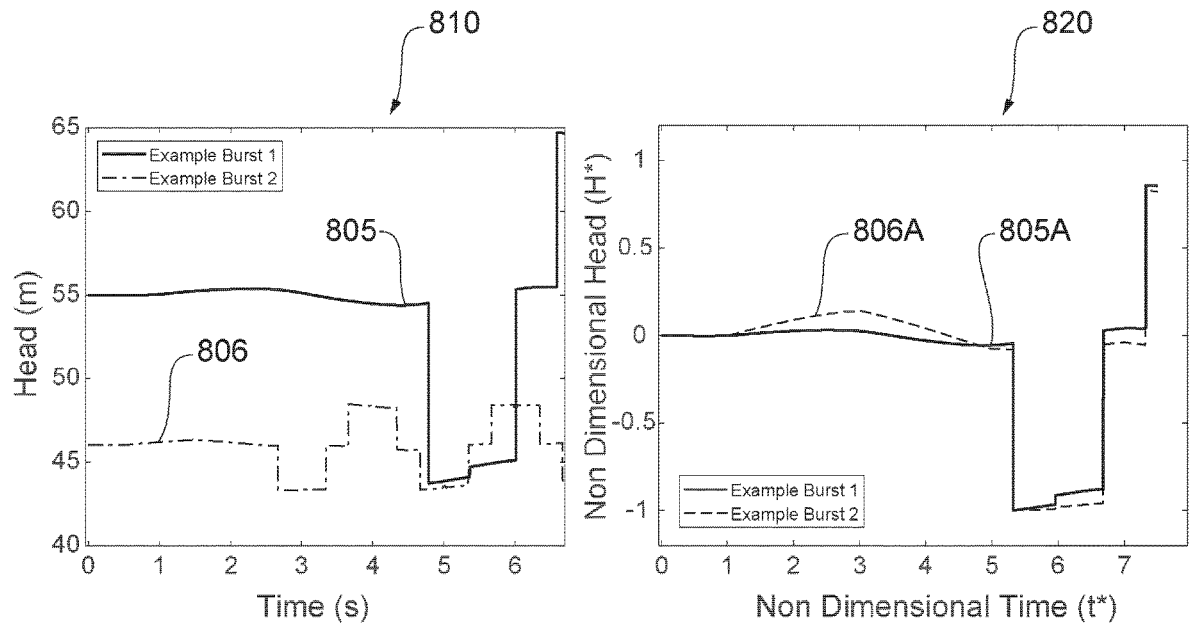
FIG. 8 are comparison plots showing two transient pressure wave signals corresponding to different systems before and after a non-dimensional transformation in accordance with an illustrative embodiment.

Referring now to FIG. 8, there is shown an example comparison plots 810, 820 of two transient pressure signals 805, 806 before and after the non-dimensional transformation which correspond to the occurrence of a burst in two different pipelines according to an illustrative embodiment. In both examples, the pipeline includes an anomaly in the form of a burst location that was selected to be at the same point along the pipeline (ie, 68% of the total length from the reservoir) but the remaining characteristics of the system are different. In this example, it can be seen that the two different transient pressure information signals corresponding to those shown in plot 810 before the non-dimensional transformation may be transformed into an equivalent non-dimensional signals 805A, 806A as shown in plot 820 which can then be tested in any of the ANNs described in the present disclosure.

As noted above, if this non-dimensional transformation is applied to the training data, the resulting trained ANN is capable of predicting results for any pipeline. However, this same transformation can be used to test an ANN that has been trained for a dimensional system. In one example, a testing sample from a different system may be transformed to a non-dimensional form and then converted into an equivalent system that the ANN has been trained and configured for.

Referring back to FIG. 7 and step 740, in one example, a subset of the down sampled numerically generated transient pressure information is used for training the ANN while another subset is used for testing the ANN (see below). In one example, half of the numerically generated transient pressure information is selected for the training process. As an example, if transient pressure information corresponding to 5,000 locations of an anomaly is numerically generated then the information corresponding to 2,500 locations may then be used for training of the ANN.

In one example, pre-processing the training data includes randomisation of the training data set so that the locations of the anomalies, as an example, are not in sequential order.

Afterwards, the input data for training the ANN (including the numerically generated transient pressure trace and the location and hydraulics characteristic of the anomaly) undergo a normalization process forming a Gaussian distribution centred at 0.0 with a standard deviation of 1.0. The numerical transform parameters applied to obtain this distribution is then saved in order to inverse transform the output values of the testing stage back to the original dimensional scale.

Referring back to FIG. 7, at step 750 the numerically generated transient pressure traces in this example are divided into time windows of pressure information of at least 2 L/a seconds of length. Considering this, each potential anomaly location used to generate the transient pressure traces will have at least several time windows of pressure information that describe the complete transient pressure trace corresponding to the anomaly. At step 760, each of the time windows of pressure information generated at step 750 is classified according to the pipeline operating condition category based on the pressure information in the time window.

As described above, there are three possible categories: i) normal operation, ii) abnormal operation with insufficient information to detect the anomaly and iii) abnormal operation with enough information to detect the anomaly. At step 770, the time windows of pressure information that have been classified as abnormal operation with enough information to both detect the anomaly and determine the anomaly characteristics are stored independently for the training of the series of anomaly detector ANNs used at step 440 (see FIG. 4).

At step 780, the classifier ANN is trained to determine the category based on down sampled time windows of pressure information and the associated values for the anomaly characteristics. In one example, the ANN weights 520 in the ANN 500 are defined based on these input data using stochastic gradient descent algorithms. These algorithms adjust the weights in the network to minimize the loss between predicted values and target values. Stochastic gradient descent algorithms work by following the gradients derived from a subsample of randomized training data. As such, these algorithms can converge to different solutions (combinations of weights in the network) in each training run, due to the effect of selecting different subsamples during the training process. Effectively, this means that every time that the ANN is trained, the results may slightly vary in the testing stage. However, for the system and method of the present disclosure, the ANNs only need to be trained once. At step 790, a series of ANNs are trained to determine the characteristics of the anomaly based on down sampled time windows of pressure information and the associated values for the anomaly characteristics. The process of training is the same as the one described for step 780.

In order to train the ANN to identify abnormal fluctuations of pressure in the pipeline, multiple locations of these anomalies are used to create the time windows that are used as training samples for the ANN (ie, see step 720). In this example, where the pipeline is assumed to have a length of 1000 metres, the distance between the locations of the anomalies is 0.2 m (creating 5,000 transient pressure traces). This distance was chosen based on the analysis referred to in PCT Application No PCT/AU2019/000148 (WO2020102846) titled "METHOD AND SYSTEM TO ANALYSE PIPELINE CONDITION", filed on 22 Nov. 2019 in the name of The University of Adelaide and whose contents are incorporated by reference. As such, the numerical simulation of the time window of transient pressure information based on the MOC (step 720) must be sufficiently resolved in terms of selection of the computational reach to reflect different transient pressure traces for each location.

The two partial differential equations that govern unsteady pipe flow behaviour in terms of flow and head have two independent variables: distance along the pipeline (x) and time (t). These equations do not have a general solution; therefore, a transformation (known as Method of Characteristics) is applied to solve these equations. The MOC transforms the two partial differential equations into four ordinary differential equations which must be treated as two pairs of equations as they are linked. In each of these pairs, one of the ordinary differential equations is:

$$\frac{dx}{dt} = \pm a$$

where a is the wave speed of the fluid in m/s.

These two equations are known as characteristics lines. When the MOC numerical method is applied, the two remaining compatibility ordinary differential equations are valid along these discretised characteristic lines. Accordingly, there is always a defined relationship between a reach length (spatial resolution of the numerical application of the MOC) and the computational time step (the Courant condition) given by:

$$\frac{\Delta x}{a} = \Delta t$$

where $\Delta x$ is the reach length used for the numerical computation in metres, $\Delta t$ is the required time step in seconds.

Considering the Courant condition as given above, for instance, to obtain pressure information or traces corresponding to each 0.2 metres distance along the pipeline, a time resolution of 0.2 milliseconds is needed (assuming a wave speed of 1,000 m/s) which results in more than 15,000 pressure values to model a period of 3 seconds. Taking into account that a spatial resolution of 0.2 metres corresponds to the case in which 5,000 locations are used for training and testing the ANN, the complete input data set in this case would include 75 million pressure values. These large data sets have made the ANN training process extremely computationally intensive and as would be appreciated have presented a barrier to adopting these techniques for monitoring for anomalies in pipelines due to the excessive data processing requirements for the training of the ANNs requiring substantial off line processing.

The present Applicant has discovered that the numerically generated pressure information 720 used to obtain the time windows of pressure information to train the ANN may be down sampled to dramatically to reduce the size of the input data required for training without compromising the training results of the ANN. Correspondingly, the measured time window of transient pressure information in the real time monitoring may also be down sampled to match the input dimension or size of the corresponding ANN. This down-sampling allows a series of ANNs, one trained to detect and classify abnormal pressure conditions and others trained to determine different types of anomalies to be applied one after the other to provide results on-site, and accurately, because each trained ANN is operating on a relatively small input data size. As would be appreciated, and as compared to prior art systems, this allows anomalies to be detected in a pipeline system in real-time which operates to provide a continuous monitoring capability.

Once a classifier ANN has been trained for classifying a time window with pressure information into one of the three categories and a series of anomaly detector ANNs have been trained for identifying the occurrence of a variety of different anomalies in pipelines, these ANNs may be used in real-time monitoring method 100 to both classify the pipeline operating condition and identify the occurrence of anomalies in pipelines following the steps outlined in FIGS. 1, 3, 4, 33 and 34.

Figure 9:
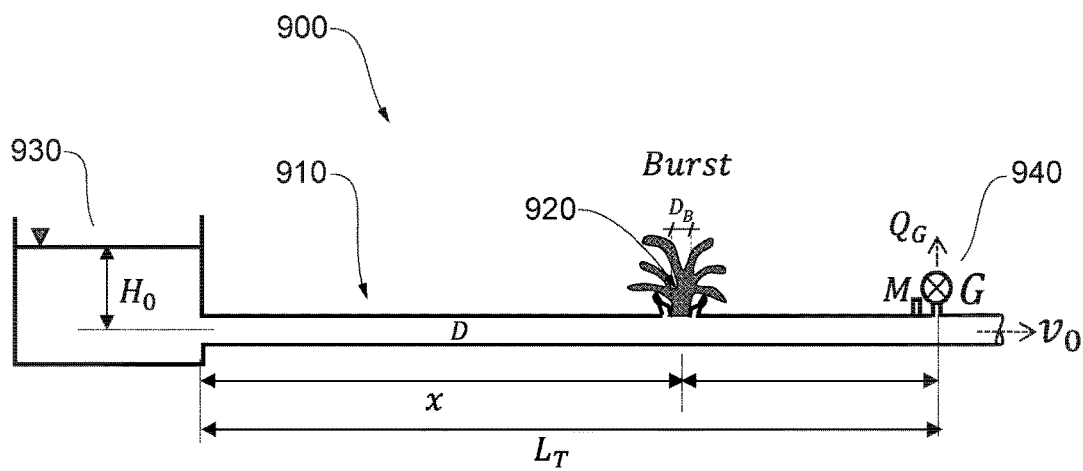
FIG. 9 is a figurative diagram of a pipeline model for training the ANN to recognise or determine an anomaly in accordance with an illustrative embodiment.

Referring to FIG. 9, there is shown a pipeline model 900 for training the ANNs to detect and characterise an anomaly according to an illustrative embodiment. In this example, the anomaly is a burst 920 in a single pipeline 910 whose size may vary. In this example, the pipeline 910 is connected at the upstream end to a reservoir 930 with a fixed head $H_0$ and at the downstream end to a side discharge valve 940 where a transient pressure wave may be generated. The location of the burst is determined by a distance x measured from the upstream reservoir and the total length of the pipeline 910 is defined as $L_T$. The diameter of the pipeline (D) is fixed for all the numerical simulations and the diameter of the burst is defined as $D_B$.

In this example, a ductile iron pipe with cement mortar lining is considered with an internal pipe diameter of 586.6 mm, a metal pipe wall thickness of 6.0 mm and a cement mortar lining thickness of 6.7 mm. An initial flow of 0.0 L/s is considered at the beginning of the numerical simulations. The total length of the pipe is 1000 metres and a Darcy-Weisbach friction factor is calculated for an assumed roughness height equal to 0.01 mm.

Considering that the detection of an anomaly in the form of a burst includes associated anomaly characteristics of both location and size, numerous different variations of bursts needed to be modelled. In this example, for all burst sizes the burst was defined as a circular orifice with diameter $D_B$ that varied in diameter between 17 mm and 88 mm. This diameter range was selected taking into account the initial pressure drop after the occurrence of the burst.

As explained previously, in this illustrative embodiment, generation of the transient pressure trace data for the training and testing (ie, see step 720 in FIG. 7) is conducted using a MOC computer numerical simulation model by changing the diameter of the burst orifice randomly with a precision of 1 mm. The location of the burst is also modified in each simulation. The period of time in the numerical model used to generate the numerical transient pressure traces was 6.74 seconds, which corresponds to a time larger than the first period of reflections 2 L/a.

Referring once again to FIG. 7, at step 710 the parameters of the input data set for the ANN need to be defined. In this example, a 1D Convolution architecture was adopted for all the ANNs following the results of the analysis in the PCT Application titled "METHOD AND SYSTEM TO ANALYSE PIPELINE CONDITION" referred to previously. Moreover, the location of the burst was changed randomly within each 0.2 metres along the pipeline in all cases. Generating pressure information in the pipelines by changing the location of the burst within a shorter segment of pipeline (say 0.1 metres) may improve the results but is likely to increase the computational time substantially.

A total of 5,000 different bursts were numerically generated with random burst sizes. Before the occurrence of the burst, each transient pressure trace contains random pressure variations that simulate the normal fluctuation of pressure in a pipeline connected to a main supply system. In one example, these pressure variations are modelled with a sinusoidal wave having random amplitude and period. In another example these pressure variations are modelled with a combination of sinusoidal waves with random amplitudes and periods. In another example these pressure variations are obtained from previously measured pressure data. After the occurrence of the burst, the numerical model generates transient pressures during at least 2 L/a seconds.

At step 750, each of the 5,000 different transient pressure traces containing transient pressure information corresponding to the occurrence of bursts are divided into time windows of pressure information. The number of time windows of pressure information obtained after step 750 depends on the length of each transient pressure trace and the length of the time windows. For the example presented in this disclosure a total of 2.35 million time windows were obtained at step 750 for the 5,000 bursts locations.

These time windows are classified in the three categories described above at step 760. In order to train the ANNs for the method and system proposed in the present disclosure, a range of input data is required. For training the classifier ANN it is necessary to use as input, time windows of transient pressure information from all the categories. However, using 2.35 million time windows as input data for the training and testing is likely to take too much computational time and power. For the anomaly detector ANNs that are trained to locate and characterise the anomalies, only the time windows of pressure information that contain enough information are required (ie, the ones corresponding to CATEGORY 3). This selection is described at step 770. In this case, no sampling is applied, and all the time windows of transient pressure information corresponding to CATEGORY 3 are used for the training and testing of the ANNs.

The Applicant has found out that using a sample from the total number of time windows of pressure information per category obtained at step 760 provides sufficiently accurate results for the classifier ANN. Different approaches to sample from the complete input data were tested. Out of the 2.35 million time windows, only 46,000 corresponded to normal pressure fluctuations; therefore, the time windows of pressure information corresponding to this category did not require sampling.

In various examples, the time windows of pressure information corresponding to CATEGORIES 2 and 3 may be sampled using three different approaches including:
1) randomly selecting approximately 46,000 time windows of transient pressure information from each of the two remaining categories (disregarding the burst location that each time windows represents);
2) selecting 10 time windows of pressure information per category in each burst location;
3) selecting 15 time windows of pressure information per category in each burst location; or
4) selecting 20 time windows of pressure information per category in each burst location.

Figure 10:
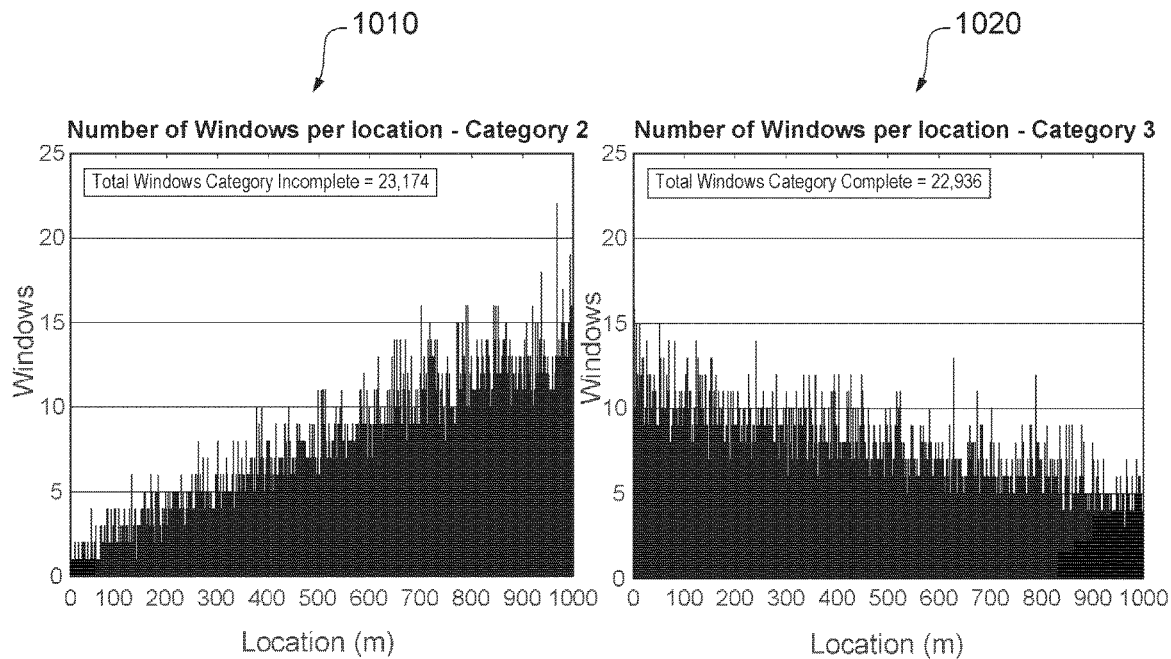
FIG. 10 are plots illustrating the distribution of time windows of transient pressure information for two of the categories that describe the condition of a pipeline used for training the first ANN that categorises the condition of the pipeline in accordance with an illustrative embodiment.

Referring now to FIG. 10, there is shown a first plot 1010 illustrating the distribution of time windows of pressure information per location for CATEGORY 2 (ie, time windows that detect the occurrence of the burst but do not contain enough information for the location and characterisation of the burst) and an equivalent second plot 1020 for CATEGORY 3 (ie, time windows that detect the occurrence of the burst with enough information for the location and characterisation) based on the first approach above.

As this approach was to complete the sampling randomly, the final distribution is not uniform and corresponds to the distribution of all the time windows of pressure information by location. In effect, FIG. 10 presents the number of time windows per location used for training the classifier ANN. A similar distribution is observed for the time windows used for the testing stage of the classifier ANN.

Referring now to FIGS. 11 to 14, there are shown plots depicting the percentage of misclassified time windows per location in each category for both the training and the testing of a classifier ANN according to various embodiments. A misclassified time window of transient pressure information is identified when the classifier ANN's output category is incorrect with respect to the actual category of the time window. In the case of CATEGORY 2, a misclassified window corresponds to a window that was classified as containing information of normal pressure fluctuation (ie, CATEGORY 1) or as a time window with enough information to proceed with a further analysis to determine the anomaly characteristics (ie, CATEGORY 3). In the same way, a misclassified time window in CATEGORY 3 corresponds to a time window that contains enough information for the location and characterisation of a anomaly but is classified as instead not having enough information (ie, CATEGORY 2) or as a normal pressure fluctuation (ie, CATEGORY 1).

Figure 11:
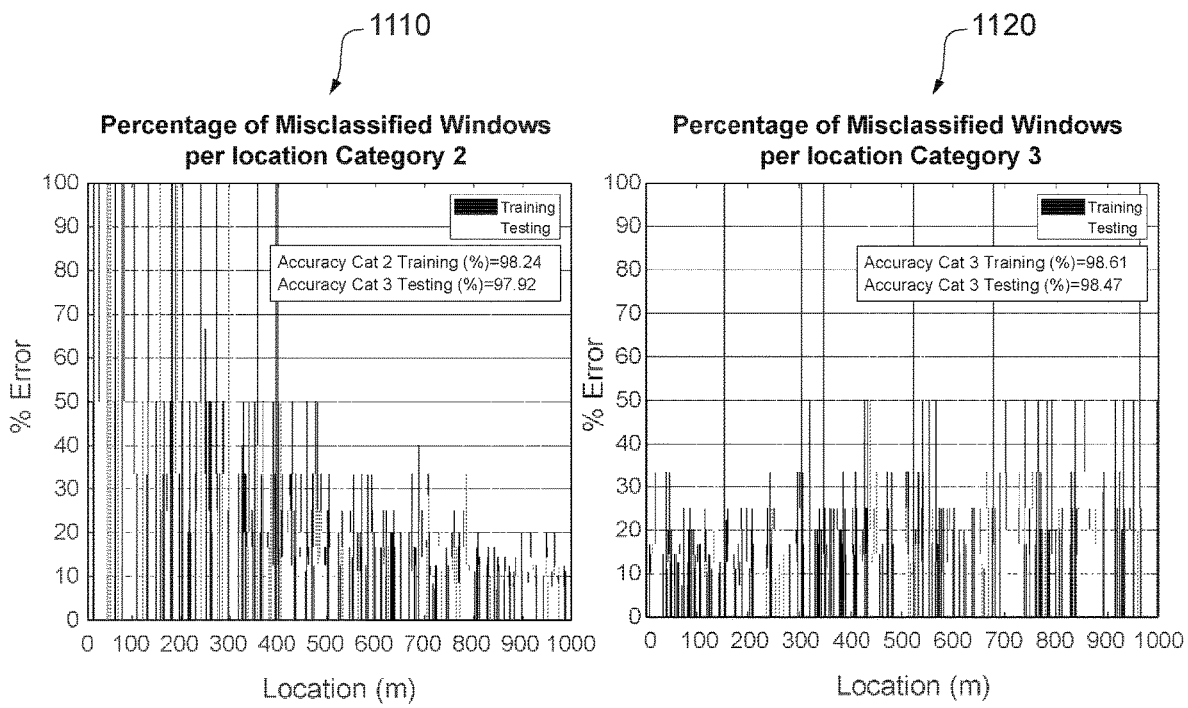
FIG. 11 are plots showing the performance of the classifier ANN for CATEGORIES 1 and 2 when the training data is based on a random selection of input data from the full input data training set in accordance with an illustrative embodiment.

Referring now to FIG. 11, there are shown plots 1110, 1120 showing the performance of the classifier ANN based on the percentage of misclassified time windows when it is trained with a random input set of time windows of pressure information and then tested on a random set of testing pressure information for CATEGORY 1 and CATEGORY 2 respectively. The output of the classifier ANN is one of the three categories available. For CATEGORY 2 it can be seen that there are some locations as far from the reservoir as 400 m in which all the trained or tested time windows were misclassified (shown as a 100% error in plot 1110). For CATEGORY 3, results showed a higher accuracy and a smaller frequency of locations where all the time windows were misclassified. However, since the distribution of time windows for a given location is not uniform, results are harder to interpret and make appropriate conclusions.

Figure 12:
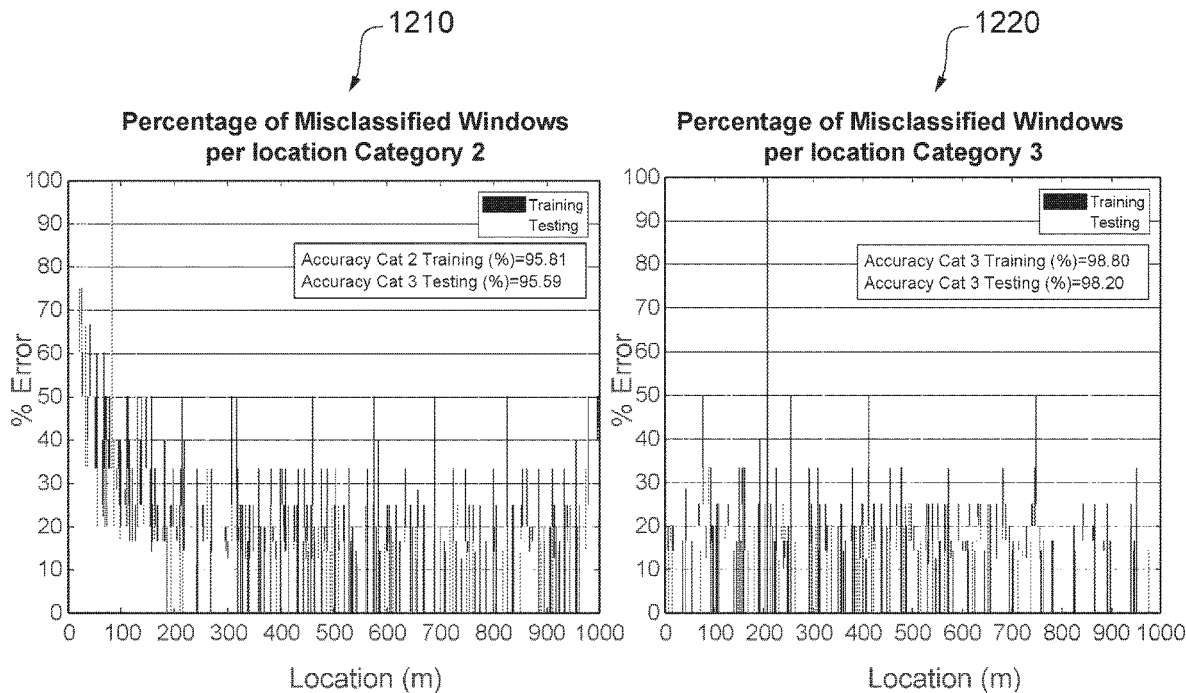
FIG. 12 are plots showing the performance of the classifier ANN for CATEGORIES 1 and 2 when the training data is based on uniformly selecting 10 time windows of transient pressure information for each anomaly location in accordance with an illustrative embodiment.

Referring now to FIG. 12, there are shown plots 1210, 1220 illustrating the performance of the classifier ANN based on the percentage of misclassified time windows when the sampling from the complete data set is carried out by uniformly selecting 10 time windows of pressure information per burst location. In adopting this approach, the classifier ANN is provided with a more uniform distribution of examples to learn from the occurrence of bursts at different locations along the pipeline. Plot 1210 presents the misclassification for CATEGORY 2 and plot 1220 shows the misclassification for CATEGORY 3. When plots in FIG. 12 are compared to plots in FIG. 11 it is evident for this example that providing a uniform distribution of windows to the classifier ANN enhances its performance both in the training and the testing process. For CATEGORY 2 there is a 10 m length at the beginning of the pipeline that the time windows are always misclassified in comparison to 400 m when using a random sampling (eg, see FIG. 11). For CATEGORY 3 there is only a single location for training and a single location for testing that results in a 100% misclassification.

Figure 13:
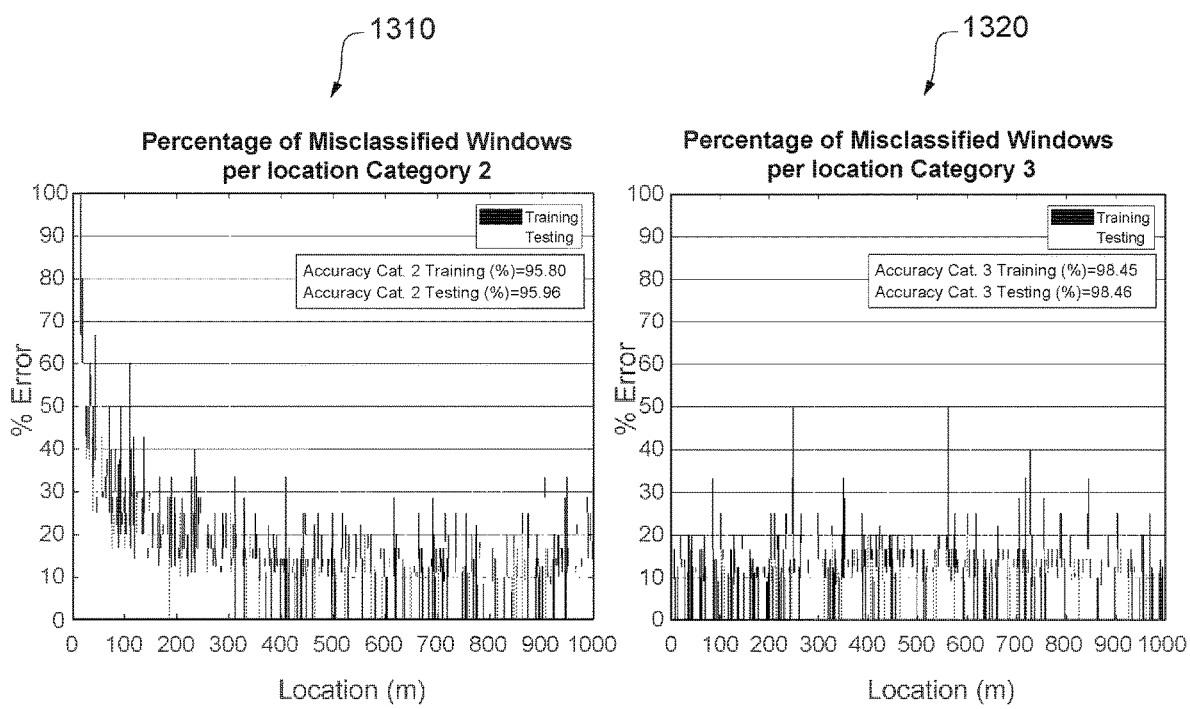
FIG. 13 are plots showing the performance of the classifier ANN for CATEGORIES 1 and 2 when the training data is based on uniformly selecting 15 time windows of transient pressure information for each anomaly location in accordance with an illustrative embodiment.

Referring now to FIG. 13, there are shown plots 1310, 1320 illustrating the performance of the classifier ANN based on the percentage of misclassified time windows when the sampling from the complete data set is carried out by uniformly selecting 15 time windows of pressure information per burst location. Plot 1310 shows that the range in which a time window that should be classified as CATEGORY 2 is classified as CATEGORY 1 or 3 in all the 15 time windows is narrowed in comparison with plot 1210. In the same way, the misclassification percentage is also reduced along the whole pipeline. Plot 1320 presents the misclassification for CATEGORY 3 with this approach. In this case, no locations present 100% error in the classification and only 3 locations present misclassification in 50% of the time windows. With this approach, the number of time windows per category increases to 75,000, however, in this example the results of the training and testing of the classifier ANN are considerably better.

Figure 14:
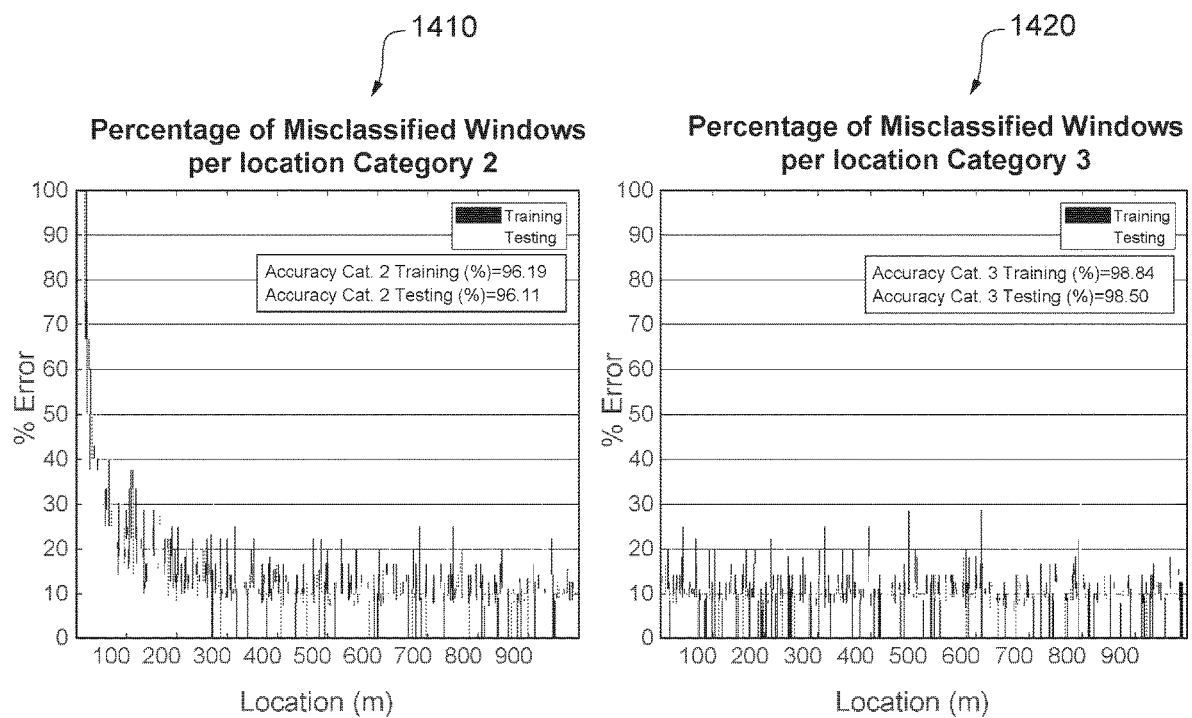
FIG. 14 are plots showing the performance of the classifier ANN for CATEGORIES 1 and 2 when the training data is based on uniformly selecting 20 time windows of transient pressure information for each anomaly location in accordance with an illustrative embodiment.

Referring now to FIG. 14, there are shown plots 1410, 1420 illustrating the performance of the classifier ANN based on the percentage of misclassified time windows when the sampling from the complete data set is carried out by uniformly selecting 20 time windows of pressure information per burst location. This corresponds to a total of approximately 100,000 time windows of pressure information in each category. Plot 1410 demonstrates that the behaviour in the classification of time windows when the burst is located at the beginning of the pipeline does not change significantly as the number of windows is increased for a given location. This is mainly because of the nature of the transient pressure trace when a burst is located close to the reservoir.

For this burst location the pressure response corresponds to a short drop of pressure that is recovered quickly given the reflection of the wave from the reservoir. As a result, it is difficult for the ANN to identify when a specific time window belongs to CATEGORY 2 and from which time window the classification then corresponds to CATEGORY 3. However, as can be seen from inspection of FIG. 14, this situation is only visible when the burst is very close to the reservoir and in a practical application of the present monitoring method and system this would mean that those time windows are classified as CATEGORY 3 and will be analysed by the rest of the ANN in accordance with step 430 (see FIG. 4). For plot 1420 it is evident that using more time windows per location enhances the accuracy of the classification for CATEGORY 3 reaching accuracy levels of 98.50%.

In this example, and based on the above evaluation, it was determined that a controlled sampling of time windows of pressure information is the most appropriate method to select the input data for the classifier ANN by uniformly selecting 20 time windows of transient pressure information per potential location of the burst. The Applicant has found that using any larger number of time windows per location does not provide a significant enhancement in the performance of the classifier ANN and it increases the computational time required for the training of the ANN.

Considering that the method and system of the present disclosure corresponds to a monitoring system, the pressure detector 210 and the module 220 (see FIG. 2) may be installed at any location along the pipeline. Once this position is determined the training process can be carried out once based on the location and the system is then ready to use for continuous pipeline monitoring.

Referring back to FIG. 4, at step 440 the time window of transient pressure information that was classified as CATEGORY 3, and the time windows corresponding to at least L/a seconds before (as a result of the consistency test at step 420), are processed and tested in a series of anomaly detector ANNs trained to locate and characterise different anomalies. At step 450, a specific statistical measure is used to generate one set of outputs from the ANNs and then compared with the measured data using a numerical model. These ANNs are trained following the process described in FIG. 7 at steps 770 and 790 where the input dataset of time windows of pressure information corresponds to all the time windows that are classified as CATEGORY 3 in the numerical generation of samples.

In this example, results from an ANN training and testing for the location and characterisation of a burst are presented. In another example, the ANN may be trained and tested to identify and characterise other anomaly types in accordance with the principles described in this disclosure including, but not limited to, a recently formed leak, the sudden closure or opening of a valve a fire-fighting test or fire-fighting event, an unusually high demand in the pipeline or the failure of a pump.

Figure 15:
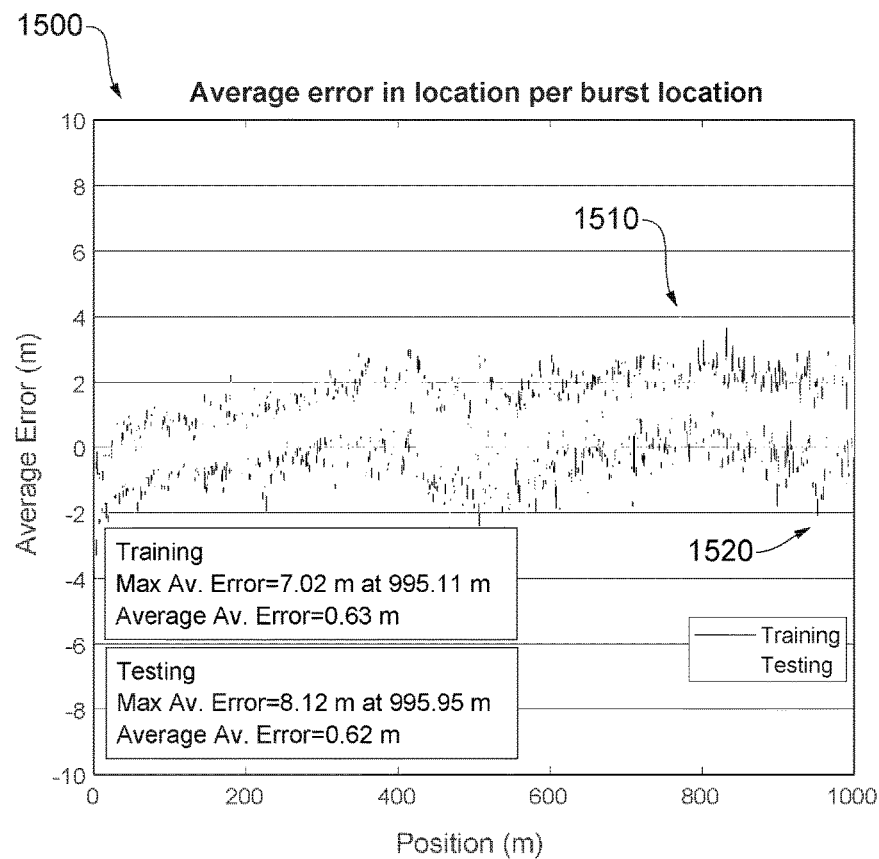
FIG. 15 is a plot showing the average error in determining the location of a burst as a function of burst location resulting from both the training and testing of an anomaly detector ANN configured to determine when the anomaly type is a burst and the associated burst characteristics in accordance with an illustrative embodiment.

Referring now to FIG. 15, there is shown a plot 1500 illustrating the average error in determining the location of a burst as a function of burst location resulting from both the training 1510 and testing 1520 of an anomaly detector ANN configured to determine when the anomaly type is a burst and the associated burst characteristics according to an illustrative embodiment. As can be seen by inspections, errors in location are in the range of −5 to 8 m in comparison to the real location of the burst. As described above, the numerically generated transient pressure traces were divided into time windows of pressure information for the training process. As a result, every burst location has several time windows associated with the same location and the same characteristics.

FIG. 15 presents the average of the error in the prediction of the location for each of the time windows associated with a specific burst location. Plots 1510 and 1520 have a similar behaviour demonstrating that the ANN is properly trained and that it is not over fitting to the training examples. The maximum error for both plots is found when the burst is 4.05 m upstream of the measurement location. For any practical application of the monitoring method and system of the present disclosure an error at this location would be clearly evident to an observer due to its proximity to the measurement location.

Figure 16:
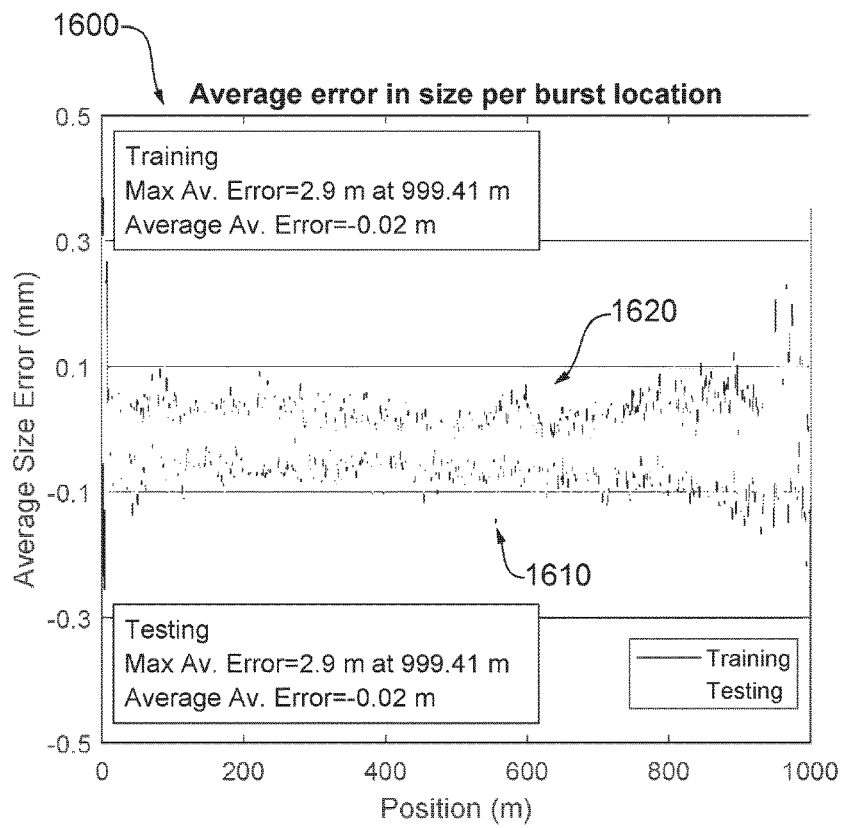
FIG. 16 is a plot illustrating the average error in determining the size of a burst as a function of burst location resulting from both the training and testing of the anomaly detector ANN configured to determine when the anomaly type is a burst and the associated burst characteristics in accordance with an illustrative embodiment.

Referring now to FIG. 16, there is shown a plot 1600 illustrating the average error in determining the size of the burst as a function of burst location resulting from both the training and testing of an anomaly detector ANN configured to determine the presence of the burst and the associated burst characteristics according to an illustrative embodiment. Plot 1610 describes the average error in the prediction of the size of the burst for time windows associated with a burst at each location of the pipeline for the training stage and plot 1620 shows the same results for the testing stage. The Applicant has discovered that the prediction for the size of the burst is extremely accurate in this embodiment with an average error value of 0.02 mm along the pipeline. In the same way that the results for the location are consistent between training and testing, the size results are also similar showing the successful training of the ANN.

Figure 17:
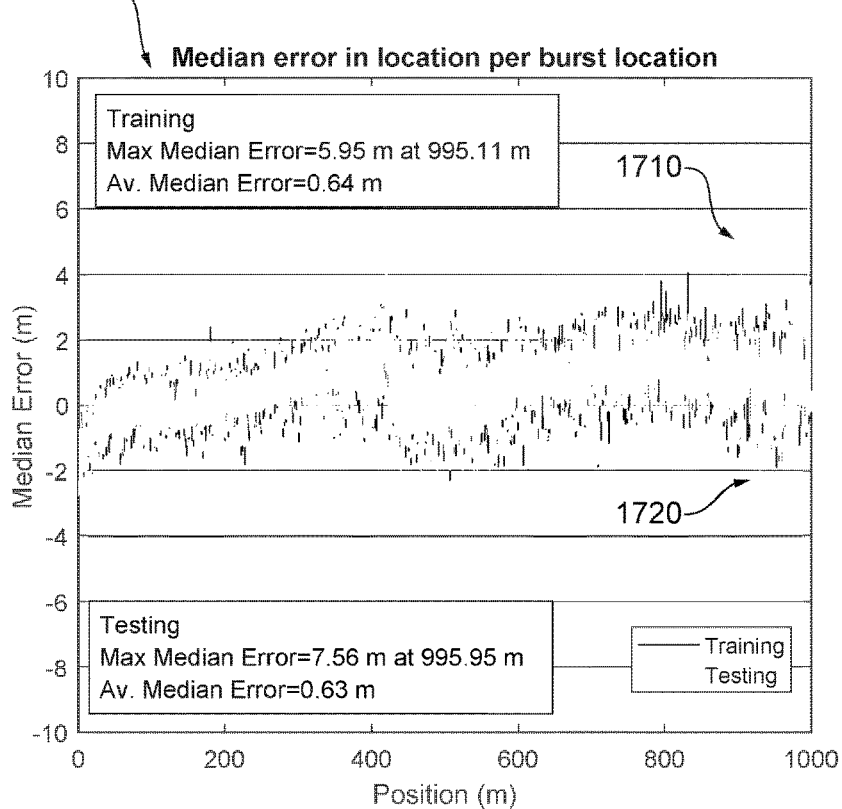
FIG. 17 is a plot illustrating the median error in determining the location of a burst as a function of burst location based on the results illustrated in FIG. 15 in accordance with an illustrative embodiment.
Figure 18:
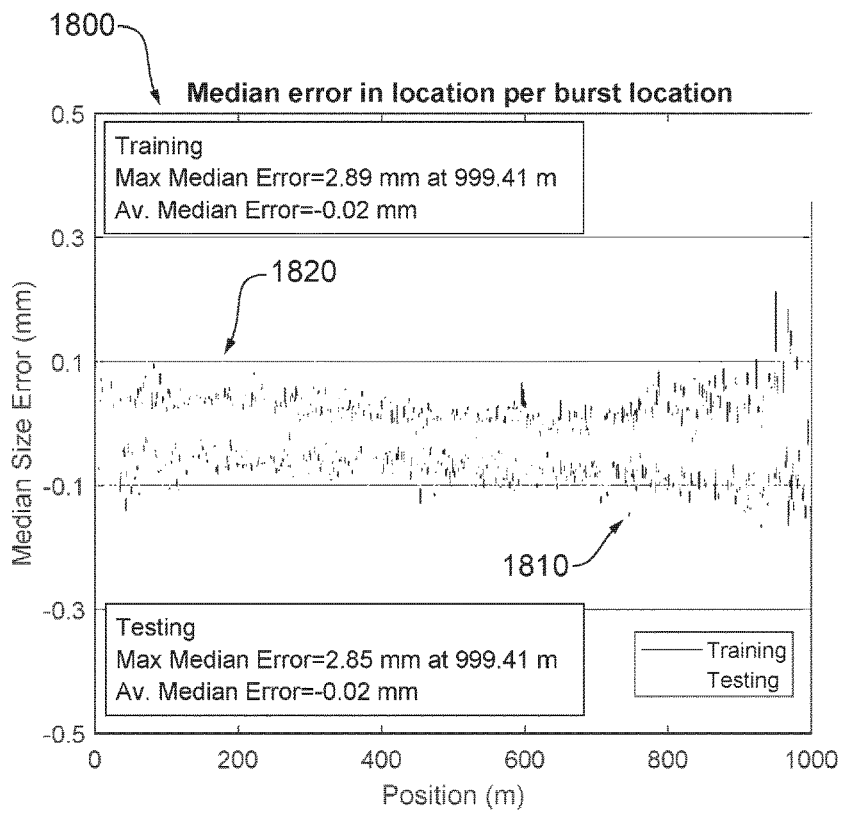
FIG. 18 is a plot illustrating the median error in determining the size of a burst as a function of burst location based on the results illustrated in FIG. 16 in accordance with an illustrative embodiment.

Referring back to FIG. 4, at step 440, the calculation of the characteristics of the anomaly is carried out considering a specific statistical measure. FIGS. 15 and 16 used average error. FIGS. 17 and 18 present the same results but using a different statistical measure, ie, the median error. Referring now to FIG. 17, the median error in the prediction of the location of the burst as a function of burst location is presented according to an illustrative embodiment. The general behaviour is similar to the average error; however, the range of errors is slightly smaller as well as the maximum and average median error. As would be appreciated, the selection of the statistical measure is likely to depend on the pipeline and the distribution of the errors per location. For the example presented in this disclosure the median error was selected as a more representative statistical measure of the results.

Referring now to FIG. 18, there is a plot illustrating the median error in determining or predicting the size of a burst along the pipeline according to an illustrative embodiment. Plot 1810 presents the error in size for the training stage and plot 1820 present the error for the testing stage. Both plots have the same behaviour showing that the ANN is not over fitting and demonstrates that the prediction of the size of the anomaly, ie, for this example where the anomaly is a burst, is highly accurate with maximum median errors of 2.85 mm.

Figure 19:
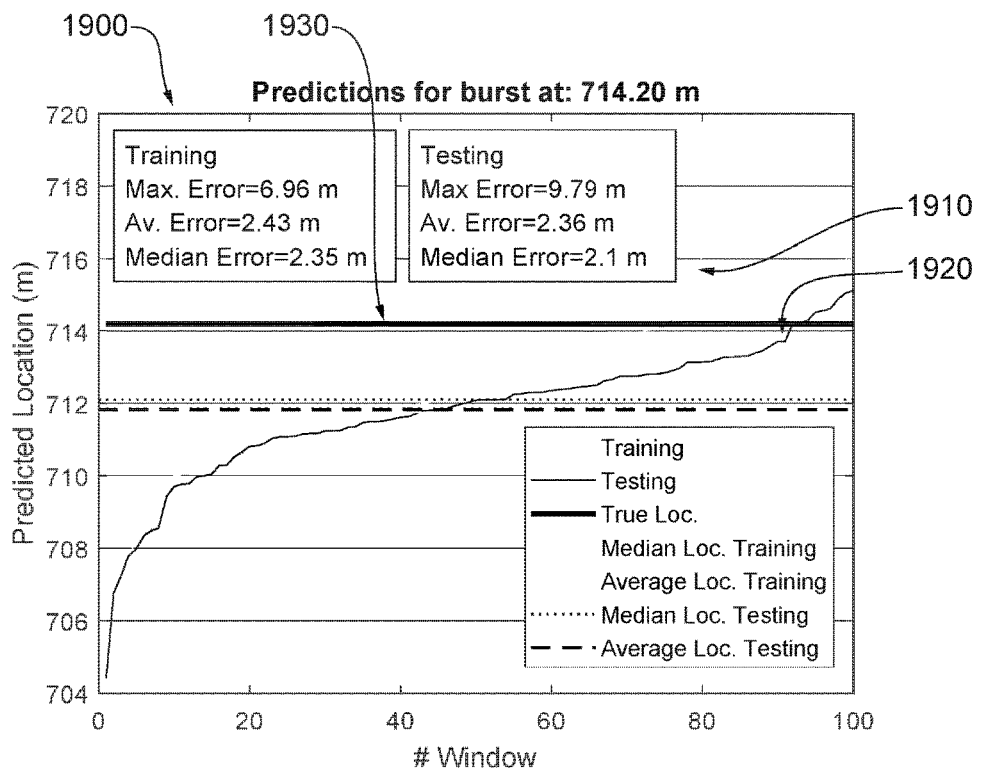
FIG. 19 is a plot of the distributions of predicted locations relative to a specific burst location for the training and testing data sample sets in accordance with an illustrative embodiment.

Referring now to FIG. 19, there is shown a plot 1900 illustrating the distribution of predicted locations for a specific burst location of 714.20 m downstream of the reservoir for the training and testing data sample sets according to an illustrative embodiment. Plot 1910 presents the predicted location for each time window of transient pressure information associated with this particular location in the testing sample. The predictions have been organised in ascending order to present its distribution. Plot 1920 shows the prediction for the testing, demonstrating that when the ANN is presented with new examples it is able to predict the location with a similar distribution. In addition, FIG. 19 depicts the value of the average and the median predicted location for comparison with the real location of the burst 1930. For this particular location, the average (711.84 m) and median (712.1 m) prediction are slightly smaller than the actual location of the burst; however, the difference is around 2 m and for a field application, this accuracy is extremely good in comparison with other existing techniques.

Figure 20:
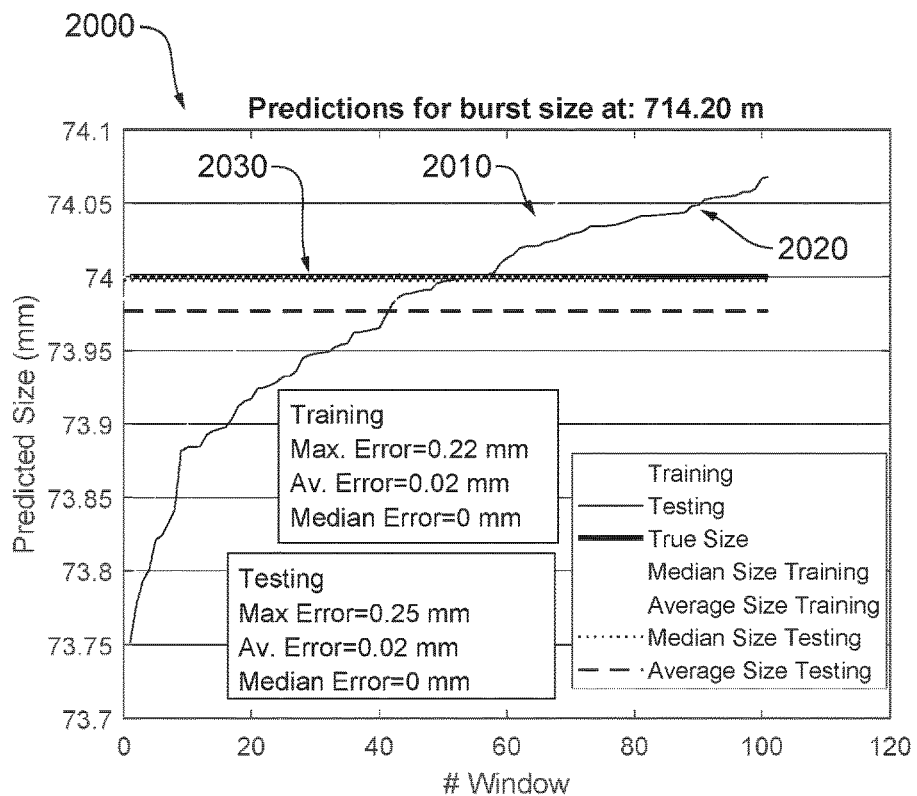
FIG. 20 is a plot of the distributions of predicted sizes for a specific burst relative to a specific burst size for the training and testing data sample sets in accordance with an illustrative embodiment.

Referring now to FIG. 20, there is shown a plot 2000 illustrating the distribution of predictions for burst size for a specific burst location of 714.20 m downstream of the reservoir and burst size of 74 mm for the training and testing data sample sets according to an illustrative embodiment. Similar to FIG. 19, size predictions have been sorted in ascending order to present its distribution. Plot 2010 represents the training results and plot 2020 the testing results. As for the predictions in location, the predictions in size follow a similar trend for the training and testing results and are highly accurate as it was pointed out above. The average and median prediction of the size is also shown in FIG. 20 to be compared with the real burst size 2030. For this particular burst location and size, the discrepancy in the prediction of the burst size is only 0.02 mm. As would be appreciated, these results will allow not only the determination of the location of the burst to be characterised but also the associated anomaly characteristic being the size of the burst.

The following section will now provide a discussion of the self-consistency of the system and method described in the present disclosure that has been described in FIGS. 3, 4, 33 and 34. In this example, two different ANNs are considered. The first is a classifier ANN trained to recognise the occurrence of a burst in a pipeline as has been described previously. The second is an anomaly detector ANN trained and configured to determine the presence of an anomaly (eg, burst) and its associated anomaly characteristics (eg, location and size of burst).

Referring once again to FIG. 1, the monitoring method and system of the present disclosure is able to detect and identify the occurrence of sudden anomalies in the pipeline, including, but not limited to a burst, a recently formed leak, the sudden closure or opening of a valve, a fire-fighting test or fire-fighting event, an unusually high demand in the pipeline or the failure of a pump system. As described above, transient pressure information is continuously sensed from a pipeline. From this measured pressure information, time windows are selected to be processed one at a time in succession. In another embodiment, successive time windows may be processed in parallel. As mentioned above, in one example the duration of the time window is at least 2 L/a seconds.

Figure 21:
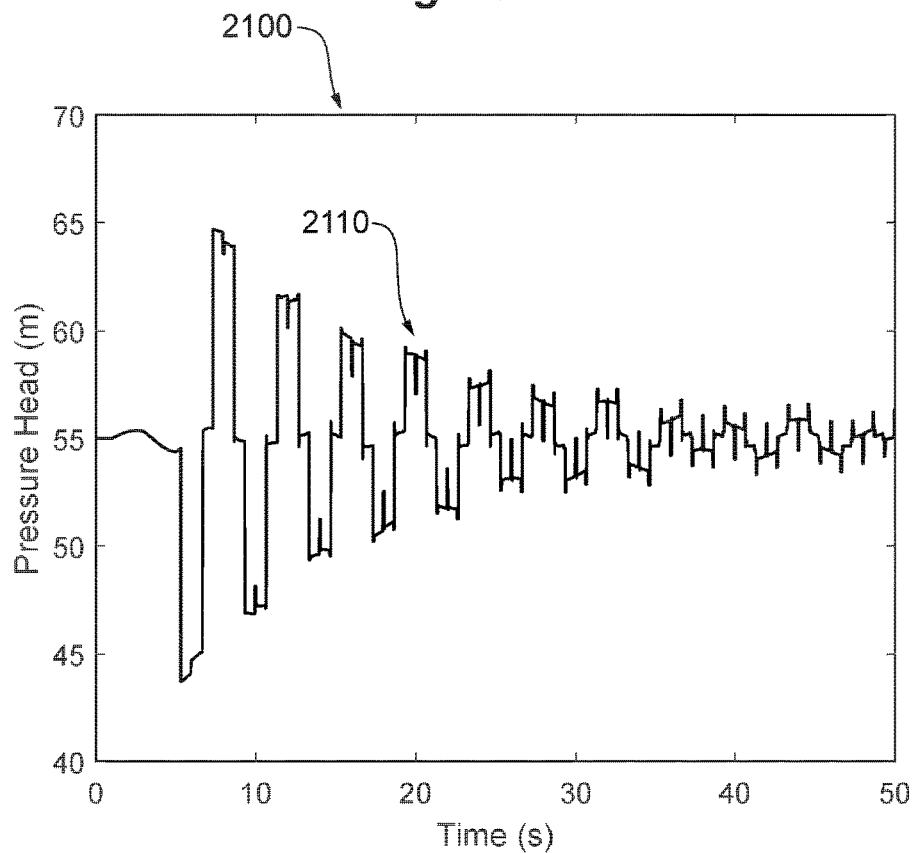
FIG. 21 is a plot of the measured transient pressure information for a burst in a pipeline having the configuration illustrated in FIG. 9 in accordance with an illustrative embodiment.

In this illustrative example, the anomaly that is to be detected is set to be a burst feature in the pipeline following the configuration shown in FIG. 9. The burst feature is located at x=680.30 m downstream of the reservoir 930 and has a size of $D_B$=42 mm. Referring now to FIG. 21, there is shown a plot 2100 of the transient pressure information 2110 as detected by a real time monitoring system corresponding to the burst referred to above according to an illustrative embodiment.

The measured pressure information or signal 2110 is obtained from an installed high-speed pressure transducer as has been described previously. By inspection, it can be seen that the effect of the burst lasts for at least 25 seconds before the pressure goes back to normal values. The duration of the time windows for this example is chosen as 2.25 seconds (2.5 L/a). In one example, the successive time windows are moved one data point at a time in the time domain to cover the entire measured anomaly; however, for the purpose of this example, all the possible time windows from the beginning of the transient pressure trace until the first 3 L/a seconds after the occurrence of the burst are analysed in parallel at the same time.

Referring again to FIG. 3, a monitoring method in accordance with the present disclosure will potentially detect an anomaly at step 330 by categorising the operating condition of the pipeline without characterising what type of anomaly has been detected. In this case, the pressure information shown in plot 2110 is divided in to time windows of transient pressure information and down sampled. Each time window of transient pressure information is then tested in the classifier ANN to determine the category of each down sampled time window.

Figure 22:
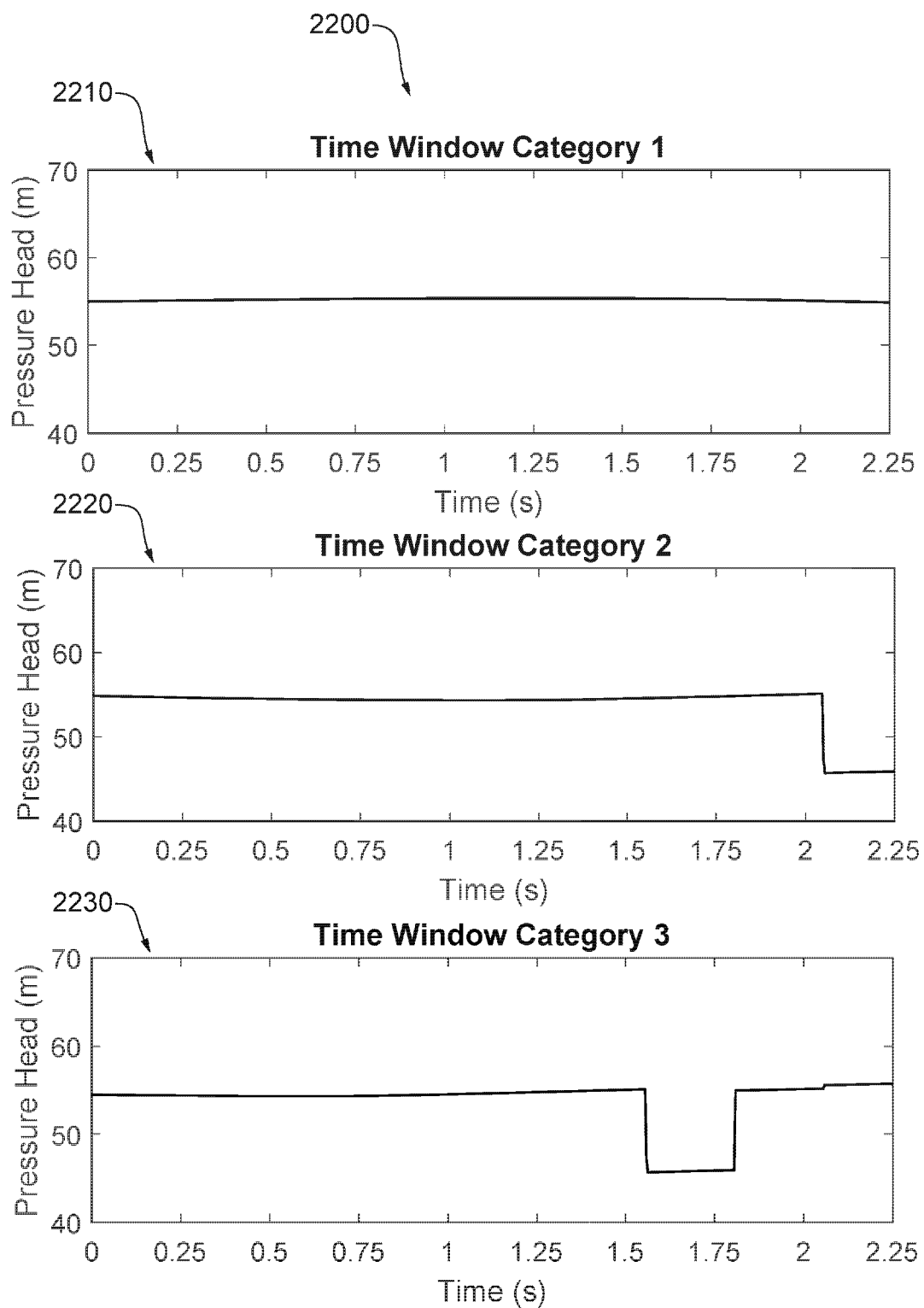
FIG. 22 is a series of plots showing three selected time windows from the measured transient pressure information illustrated in FIG. 21 representing examples of each pipeline condition category for the application of the classifier ANN trained to classify the time windows of transient pressure information in accordance with an illustrative embodiment.

Referring now to FIG. 22, there are shown the transient pressure traces 2200 for three selected time windows 2210, 2220, 2230 according to an illustrative embodiment. By inspection, it is possible to differentiate between the three time windows, the time window that represents a normal pressure fluctuation (ie, time window 2210), a time window that contains information about the occurrence of the burst but does not have enough information as yet to locate it (ie, time window 2220) and the time windows that contains full evidence of the burst (ie, time window 2230). According to the method and system proposed in this disclosure, time window 2210 would be classified in CATEGORY 1, time window 2220 would be classified in CATEGORY 2 and the time window 2230 would be classified in CATEGORY 3.

Figure 23:
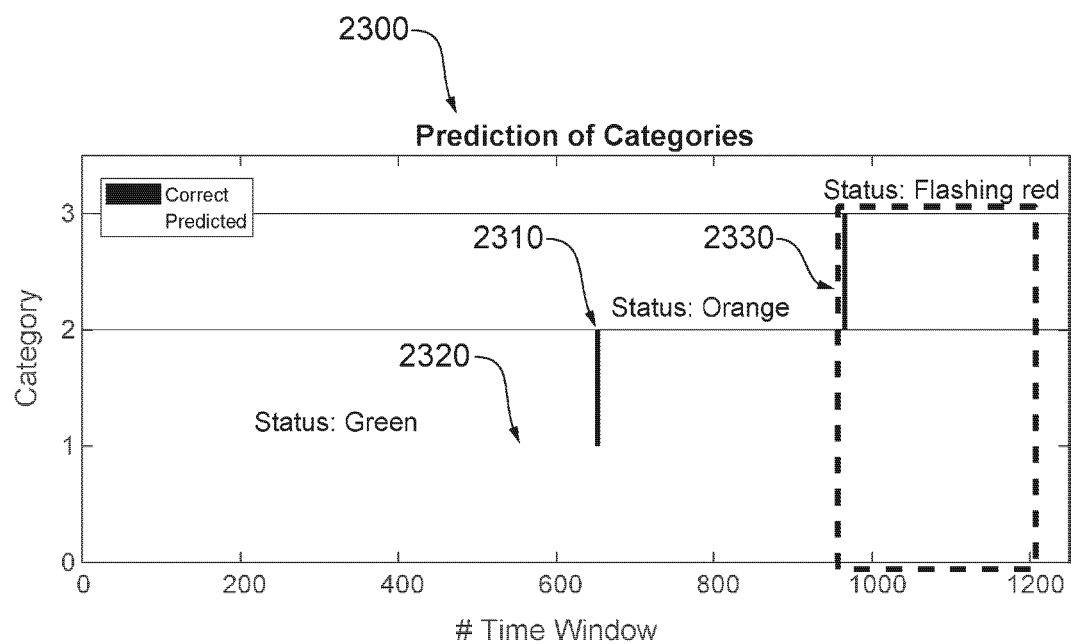
FIG. 23 is a plot of the results in the prediction of the categories for each time window of transient pressure information from the measured transient pressure information illustrated in FIG. 21 in accordance with an illustrative embodiment.

In this illustrative example, when the selected portion of the transient pressure trace is divided into time windows, 1267 times windows are created. Each of these time windows are then tested by the classifier ANN to detect each of the 3 categories available. Referring now to FIG. 23, there is shown a plot 2300 of the resulting classification of the time windows from the classifier ANN based on the measured transient pressure information illustrated in FIG. 21. The correct category for each time window is presented as series 2310 while the predicted category as result of application of the classifier ANN is presented as series 2320. Inspection of FIG. 23 indicates that the classifier ANN is highly accurate in identifying correctly the category of each time window. There is a small difference between the real categories and the predicted categories for both CATEGORIES 2 and 3 representing a time lag during which the classifier ANN does not identify the time window correctly at 2330, however, this time lag is short and would not significantly affect the results.

Referring back to FIG. 3, the monitoring system proposed in the present disclosure included a preliminary alarm system based on the status of the pipeline. Depending on the category in which each time windows is assigned, the status of the pipeline changes between three system monitoring statuses: green, orange and flashing red. FIG. 23 presents the time windows that correspond to a green status (CATEGORY 1), an orange status (CATEGORY 2) and a flashing red status (CATEGORY 3).

Figure 24:
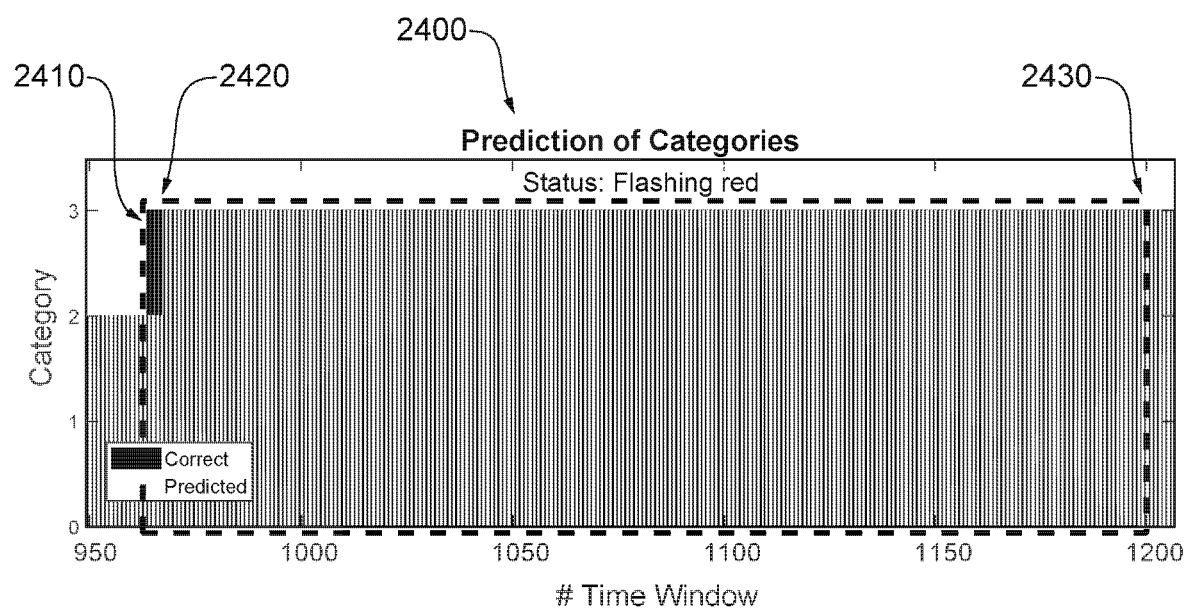
FIG. 24 is an enlarged plot of the results in the prediction of the categories illustrated in FIG. 23 in accordance with an illustrative embodiment.

Referring now to FIG. 24, an enlarged view of area 2330 of FIG. 23 is presented. By inspection it can be seen that the lag 2410 between the correct change in CATEGORY 2 to 3 and the same change in the predicted results corresponds to four time windows. This means that the classifier ANN does not correctly classify those four time windows and despite the fact that those time windows already contain enough information to locate and characterise the anomaly, the ANN does not recognise this. However, considering that the time step of the time windows after the downsampling process is 0.004 s (corresponding to a down sampled frequency of 256 Hz), the time lag in the identification of the time window category is only 0.016 s. The time window 2420 is the first time window that is classified as CATEGORY 3 which would correspond to step 410 in FIG. 4.

Referring back to FIG. 4, at step 420 the method will conduct the consistency test to determine if there are enough consecutive windows that have been classified in CATEGORY 3. In the case of analysing time window 2420 the result from this test will be negative since this is the first time window that was classified in CATEGORY 3 (ie, Condition "NO" at step 420B). The time window classification will continue until time window 2430 when the result from the consistency in classification test will be positive. For this particular example the consistency check is conducted over 230 time windows which represents L/a seconds. At step 430, the consecutive time windows that have been classified as CATEGORY 3 during L/a seconds are selected. The ANN trained to locate and characterise the presence of a burst was tested on this batch of L/a time windows to find the location and size of the burst anomaly.

Figure 25:
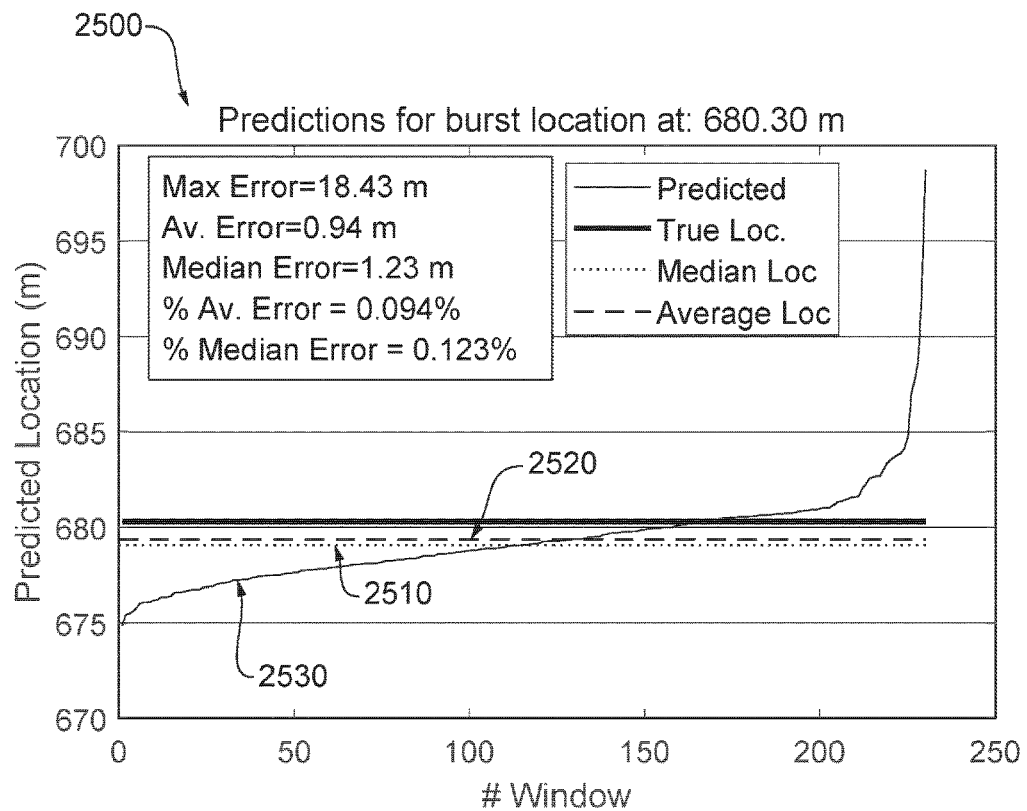
FIG. 25 is plot of the distribution of predicted locations for a specific burst for all the time windows of transient pressure information classified as CATEGORY 3 in accordance with an illustrative embodiment.

Referring now to FIG. 25, there is shown a plot 2500 depicting the distribution of predictions for the burst location after the testing of the selected time windows in the classification ANN for consistency. The predictions have been organised in ascending order to present its distribution. In this example, A total of 230 windows were tested. Plot 2510 presents the median predicted location (679.07 m), plot 2520 shows the average predicted location (679.36 m) and the distribution of the prediction of the location is presented in plot 2530. It can be seen that the distribution of the location prediction has the same behaviour as the one presented in FIG. 19, demonstrating the consistency in the performance of the anomaly detector ANN. Considering this, the median burst location was predicted at 679.07 m downstream of the reservoir.

Figure 26:
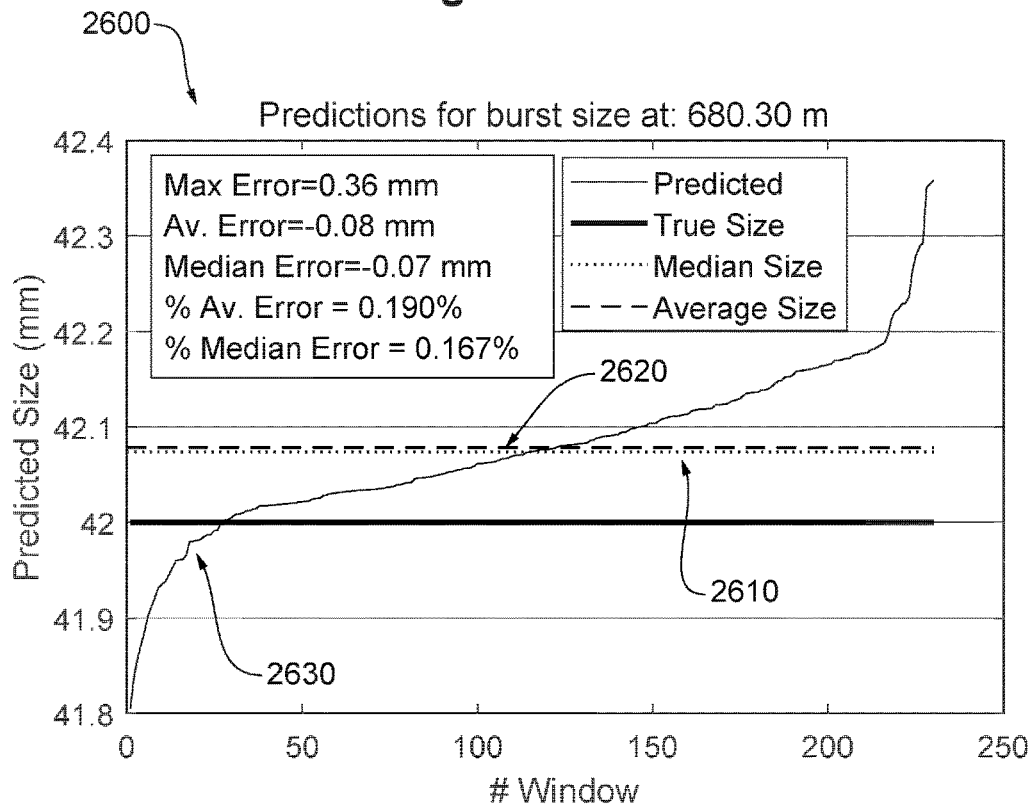
FIG. 26 is a plot of the distribution of predicted burst sizes for a specific burst for all the time windows of transient pressure information classified as CATEGORY 3 in accordance with an illustrative embodiment.

Referring now to FIG. 26, there is shown a plot 2600 depicting the distribution of prediction of the burst size according to an illustrative embodiment. Similar to FIG. 25, results for the prediction of the burst size 2630 are accurate and follow the same behaviour shown during the training and testing stage of the ANN. Referring back to step 450 in FIG. 4, the anomaly characteristics are calculated from the results obtained after processing the selected time windows in the ANN using a selected statistical measure. For this particular example, the median prediction is selected as the best statistical measure to predict the characteristics of the burst. Referring back to FIG. 25, the median location 2510 is not closer to the real burst location in comparison with the average location 2520; however, in a real application it is not possible to determine this and the median error performed better in the training and testing of the ANNs. From FIG. 26, the median size 2610 is more accurate than the average size 2620 in predicting the characteristic associated with the burst which for this particular example corresponds to the burst size. Considering this, step 450 in FIG. 4 would result in a median burst location of 679.07 m and a median burst size of 42.07 mm.

Referring back to FIG. 4, at step 460 the predicted results undergo a physical consistency check based on the physical characteristics of the pipeline. For the example shown in this disclosure, the location and size of the bursts are logical (ie, within appropriate limits or bounds of the pipeline) corresponding to Condition "YES" 460A. In another example, the results might be illogical or unphysical (eg, corresponding to a location of the burst outside of the length of the pipeline and/or a size prediction out of the training range) and the method proposed in this disclosure would proceed to test the same time windows in a different anomaly detector ANN trained to locate and characterise another type of anomaly following Condition "NO" 460B to step 490.

Referring again to FIG. 33, which supplements FIG. 4, at step 470, a time window transient pressure information is numerically generated considering the results from step 450.

Figure 27:
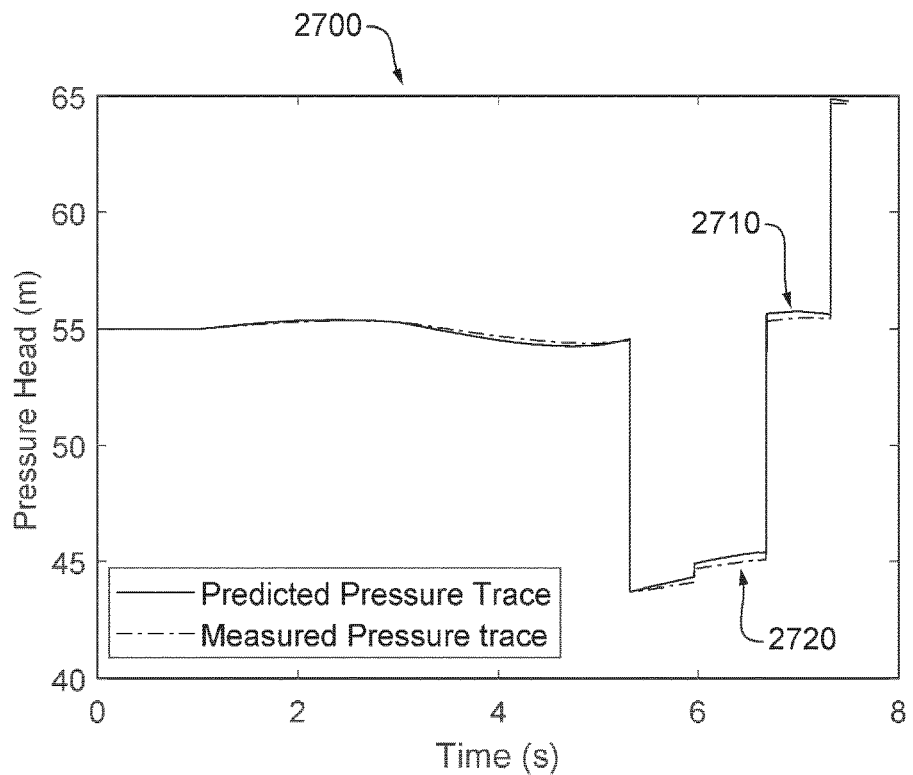
FIG. 27 is a plot of the transient pressure trace of the example presented in FIG. 21 and the numerically generated transient pressure trace from the ANN results in accordance with an illustrative embodiment.

Referring now to FIG. 27, there is shown a plot 2700 depicting a comparison between a numerically generated transient pressure information 2710 based on the anomaly characteristics determined by the anomaly detector ANN and the measured transient pressure information 2720 according to an illustrative embodiment. By inspection it can be seen that the traces are similar, which represents a YES (480 A) in FIG. 33 resulting in an alarm being triggered (Status: red) reporting the occurrence of a burst at 678.89 m downstream of the reservoir of the pipeline at step 4100.

In another illustrative example, the anomaly that is to be detected is set to be a burst feature in the pipeline following the configuration shown in FIG. 9. The burst feature is located x=815.45 m downstream of the reservoir 930 and has a size of $D_B$=400 mm. A measured pressure information trace is obtained from a high-speed pressure transducer as has been described previously. This trace is divided into time windows of transient pressure information and down sampled to be analysed according to the process shown in FIG. 3. Each of these time windows are tested using the classifier ANN to classify each time window into the defined categories as described previously.

Figure 28:
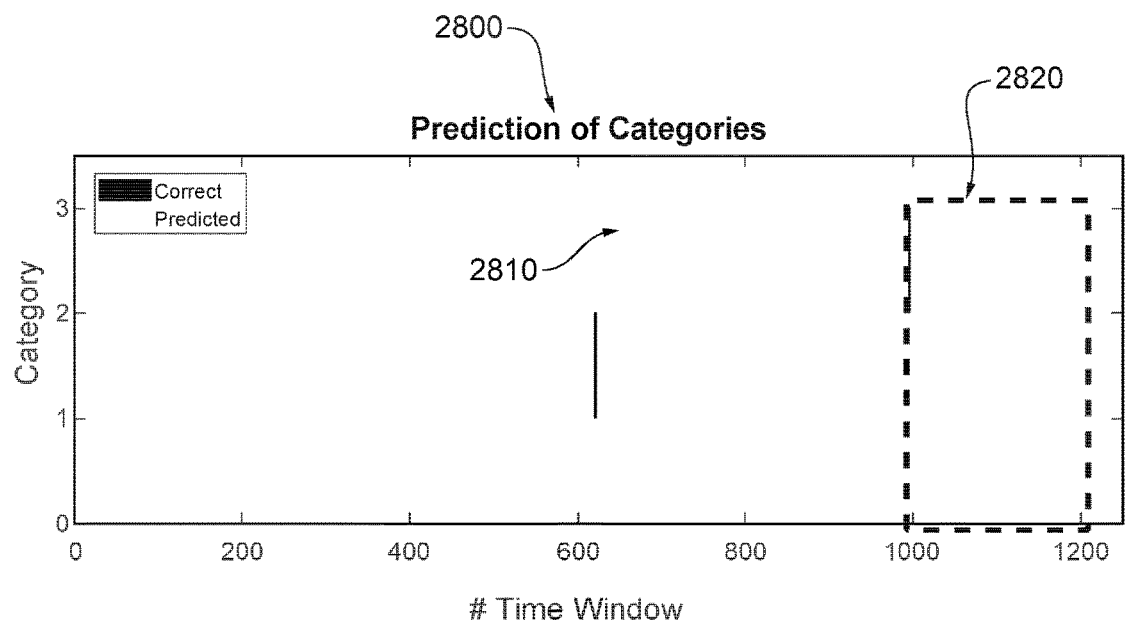
FIG. 28 is a plot of the results in the prediction of the categories for each time window of transient pressure information for a second example burst in accordance with an illustrative embodiment.

Referring now to FIG. 28, there is shown a plot 2800 of the prediction of classification of the measured time windows according to an illustrative embodiment. The accurate category for each time windows is presented in black while the predicted category is presented in grey. By inspection, it is evident that the classifier ANN misclassifies some of the time windows of transient pressure information that belong to CATEGORY 2 as CATEGORY 3, as shown for time window 2810. Referring back to FIG. 4, at step 420, the test of consistency in the classification is able to detect that those windows are misclassified because the result for classification as CATEGORY 3 is not constant during L/a seconds.

This is achieved for the time windows shown as 2820 where the classification at CATEGORY 3 is consistent for L/a seconds for this set of time windows.

Referring back to FIG. 4, at step 440 the time windows of pressure information 2820 are used to determine the prediction of the location and characteristics of the anomaly. Considering this, at step 450, the ANN predicts a median burst location of 814.11 m and a median burst size of 30.37 mm. At step 460 the predicted results undergo a physical consistency test to determine if they are logical, which for this example corresponds to condition 460A. Referring again to FIG. 34, at step 470 a numerical trace is generated considering the predicted location and size of the burst. With this numerical pressure information trace, at step 480 the burst location results are assessed.

Figure 29:
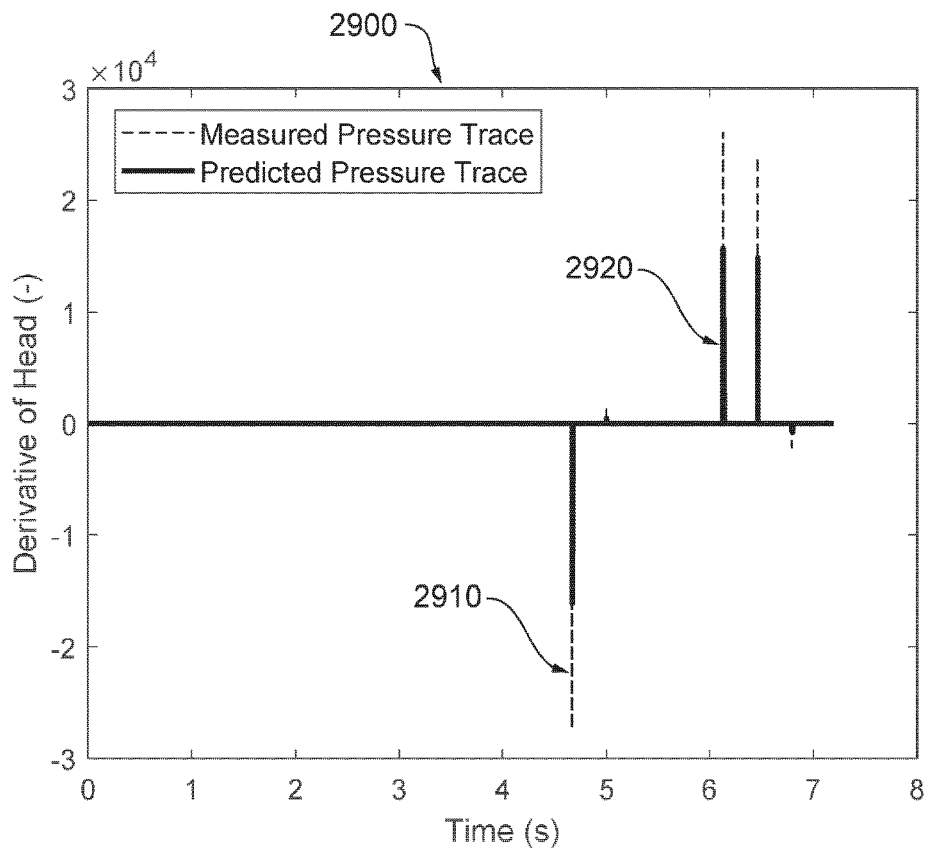
FIG. 29 is a plot comparing the time derivative of the measured pressure information as compared to the time derivative of the numerically generated pressure information in accordance with an illustrative embodiment.

Referring now to FIG. 29, there is shown a plot 2900 comparing the time derivative of the measured pressure information as compared to the time derivative of the numerically generated pressure information according to an illustrative embodiment. Plot 2910 depicts the derivative for of the measured transient pressure trace and plot 2920 depicts the derivative of the predicted pressure information trace. By comparing these two plots it is possible to conclude that the prediction of the location of the burst is accurate given that the significant changes in the derivatives occur at approximately the same time in both traces. This situation corresponds to condition 480A as shown in FIG. 34.

Figure 30:
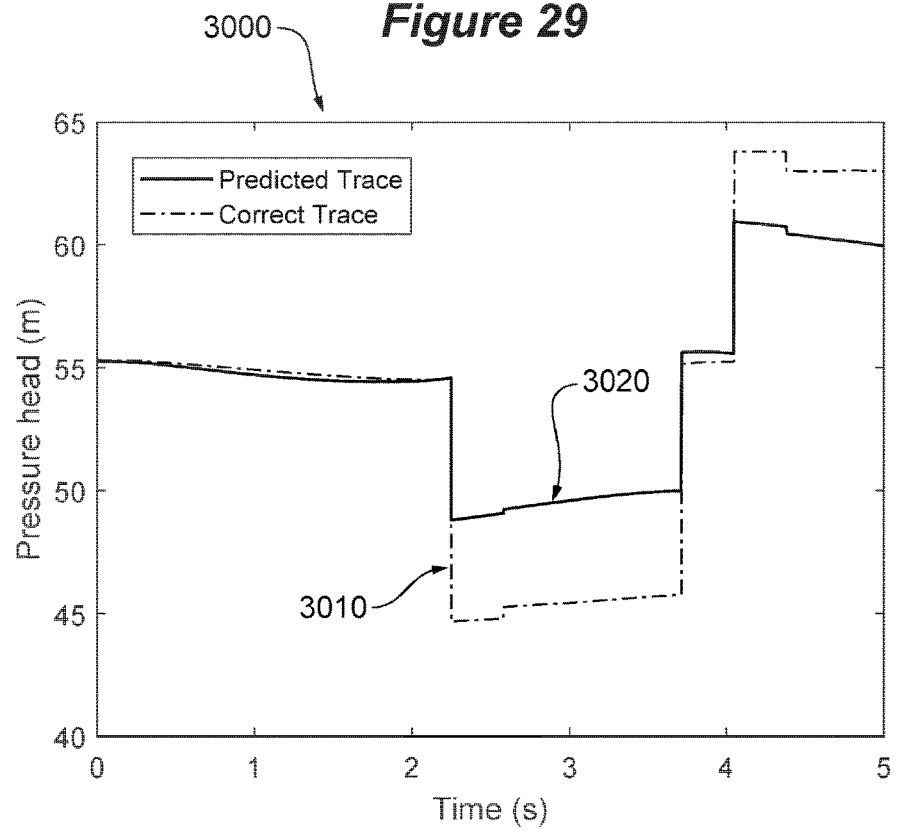
FIG. 30 is a plot comparing the predicted transient pressure trace and the measured transient pressure trace in accordance with an illustrative embodiment.

Referring now to FIG. 30, there is shown a plot 3000 comparing the predicted transient pressure trace resulting from step 470 and the measured transient pressure trace according to an illustrative embodiment. Plot 3010 shows the measured transient pressure trace and plot 3020 presents the predicted transient pressure trace. By computing the root mean square error of the differences between these two pressure plots, is possible to conclude that the burst size prediction is not accurate enough because the size of the burst is under predicted. This situation corresponds to condition 485B in FIG. 34 and a correction of the prediction of the size is required.

Figure 31:
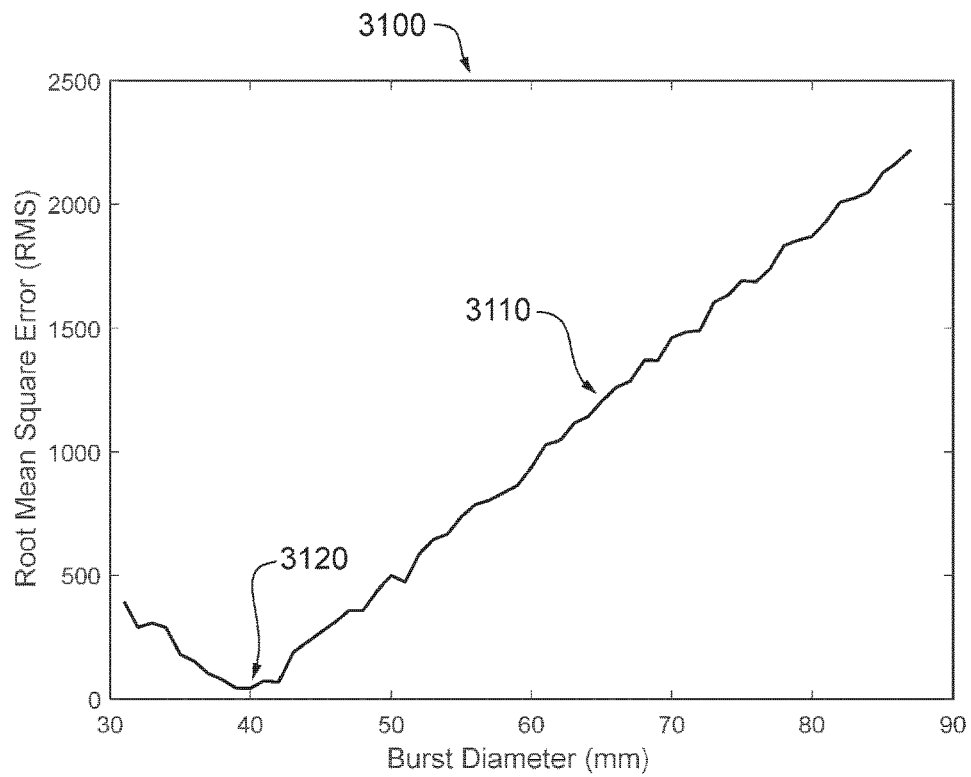
FIG. 31 is a plot illustrating the variation of RMS error between the predicted transient pressure trace for a range of input burst sizes and the measured transient pressure trace in accordance with an illustrative embodiment.

Referring now to FIG. 31, there is shown a plot 3100 illustrating the variation of RMS error between the predicted transient pressure trace for a range of input burst sizes and the measured transient pressure trace according to an illustrative embodiment. Considering that from the previous step it was found that the prediction of the burst size was underestimated, the estimate refinement process is directed to exploring burst sizes between 31 mm and 88 mm (ie, the maximum burst size) by determining the predicted transient pressure trace iteratively for increasing burst size and determining the RMS error. FIG. 31 indicates that the RMS has a minimum value 3120 that corresponds to 39 mm and moving to a larger diameter results in an increased RMS error 3110 between the measured transient pressure trace and the numerically generated transient pressure trace. Considering these results, the final refined prediction of the method is the presence of a burst at 814.11 m with a burst size of 39 mm. It would be appreciated that other error measures that quantify the difference between two pressure traces or time windows of transient pressure information may also be adopted in combination with optimisation approaches that seek to determine the minimum error. In another embodiment, and as an alternative to the optimisation approach, an inverse analysis could be used as appropriate.

Figure 32:
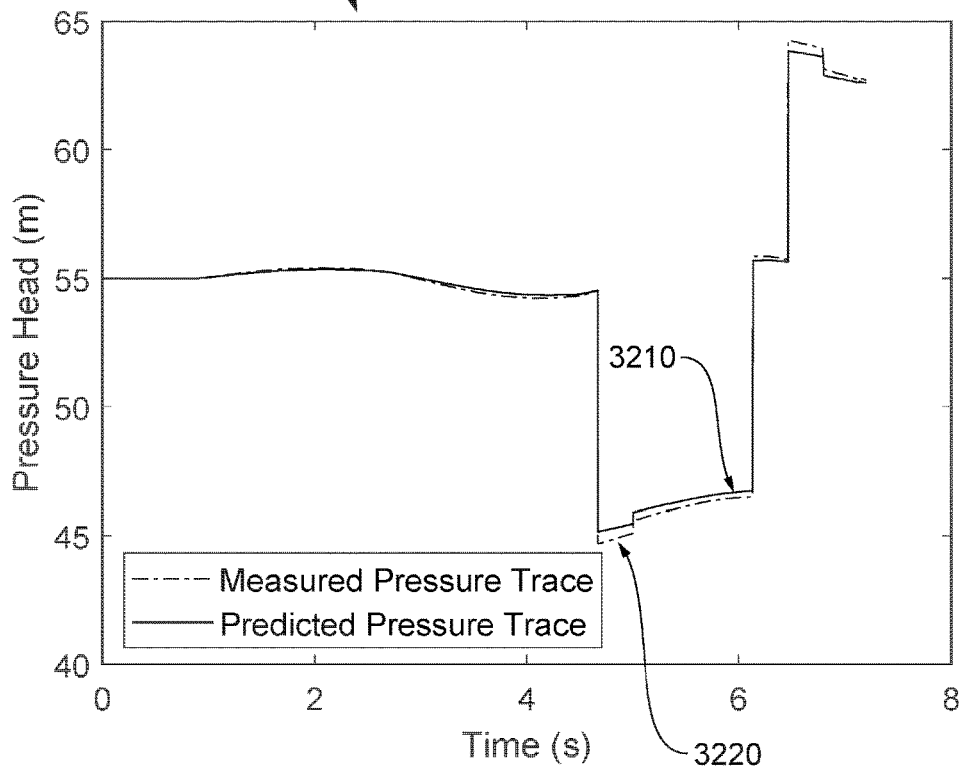
FIG. 32 is a plot comparing the numerically generated pressure information trace following refinement of the original determined characteristics of the anomaly and the measured transient pressure trace in accordance with an illustrative embodiment.

Referring now to FIG. 32, there is shown a plot 3200 comparing the numerically generated pressure information trace following refinement of the original determined characteristics of the anomaly and the measured transient pressure according to an illustrative embodiment. As can be seen by inspection, and by comparison with FIG. 30, there is much better agreement between the numerical and measured pressure traces. Considering that both of the transient pressure traces are similar, an alarm would be triggered (Status: Red) due to satisfaction of Condition "YES" 485A in FIG. 34 reporting the occurrence of a 39 mm burst at 814.11 in downstream of the pipeline at step 4100.

As would be appreciated, methods and systems for monitoring pipeline condition implemented in accordance with the present disclosure provide a real time solution for the ongoing continuous monitoring of pipeline systems and networks without relying on any a priori knowledge of the pipeline or pipeline system being analysed. As referred to above, as long as the anomaly is able to be mathematically modelled using an appropriate hydrodynamic model of the pipeline, the training (and testing) sample sets of down sampled transient pressure wave signals may be generated to cover an appropriate range of anomalies to train and test respective ANNs on these sample sets. These ANNs may then be applied when monitoring transient pressure wave information to both carry out a high level monitoring of pipeline operating condition determining when an anomaly occurs as well as determination and characterisation of any detected anomaly and its associated anomaly characteristics. Recognising that both the training, testing and analysis data may be substantially down sampled greatly reduces the computational effort required in training and testing the ANN and then eventually adopting the ANN for monitoring purposes.

Those of skill in the art would further appreciate that the various illustrative logical blocks, modules, circuits, and algorithm steps described in connection with the disclosed embodiments may be implemented as electronic hardware, computer software or instructions, or combinations of both. To clearly illustrate this inter-changeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. In various embodiments of the present disclosure, a single component or module may be replaced by multiple components, and multiple components may be replaced by a single component, to perform a given function or functions.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgment of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for real time monitoring of a condition of a pipeline, comprising:
    continuously monitoring transient pressure information of a fluid in the pipeline;
    selecting a time window of transient pressure information; and
    processing the time window of transient pressure information to detect an anomaly in the pipeline, wherein processing the time window of transient pressure information comprises:
    down sampling the time window of transient pressure information to generate a down sampled time window of pressure information; and
    processing the down sampled time window of transient pressure information by a classifier artificial neural network (ANN) trained to categorise a pipeline operating condition, wherein a size of the down sampled time window of transient pressure information has a same size as an input to the classifier ANN; and
    determining by the classifier ANN the pipeline operating condition for the time window.

2. The method of claim 1, wherein the pipeline operating condition is categorised as a normal operating condition where no anomaly is present in the time window of transient pressure information or an abnormal pressure condition where an anomaly is present in the time window of transient pressure information.

3. The method of claim 2, wherein the category of abnormal pressure condition is further categorised into a first abnormal pressure condition signifying only a presence of an anomaly in the time window of transient pressure information or a second abnormal condition where not only the presence of an anomaly is detected in the time window of transient pressure information but also that anomaly characteristics related to the anomaly in the time window of transient pressure information may be determined.

4. The method of claim 3, wherein processing the time window of transient pressure information comprises:
    following determining that the time window of transient pressure information is categorised in the second abnormal condition; then
    processing the down sampled time window of transient pressure information by a first anomaly detector ANN trained to detect a first type of anomaly in the pipeline and to determine associated anomaly characteristics for the first type of anomaly; and
    verifying whether the first type of anomaly is detected in the time window of transient pressure information.

5. The method of claim 4, wherein verifying whether the first type of anomaly is detected in the time window of transient pressure information comprises determining whether the determined associated anomaly characteristics are consistent with the pipeline.

6. The method of claim 5, wherein determining whether the determined associated anomaly characteristics are consistent with the pipeline includes determining whether a location of the anomaly is consistent with a length of pipeline.

7. The method of claim 5, wherein on determining that the determined associated anomaly characteristics are consistent with the pipeline, verifying whether the first type of anomaly is detected in the time window of transient pressure information further comprises:
    numerically generating a time window of theoretical pressure information based on the first anomaly type and associated anomaly characteristics;
    comparing the selected time window of transient pressure information as measured with the time window of theoretical pressure information as numerically generated to determine a comparison measure; and
    applying a comparison threshold to the comparison measure to indicate that the first type of anomaly is detected in the time window of transient pressure information.

8. The method of claim 7, wherein on determining that the numerically generated time window of transient pressure information is partially consistent with the selected time window of transient pressure information the method further comprises:
    refining one or more anomaly characteristics to obtain a better match between the numerically generated time window of transient pressure information and the selected time window of transient pressure information.

9. The method of claim 4, wherein on failing to verify that the first type of anomaly is detected in the time window of transient pressure information the method comprises processing the down sampled time window of transient pressure information by a second anomaly detector ANN trained to detect a second type of anomaly in the pipeline and to determine associated anomaly characteristics for the second type of anomaly.

10. The method of claim 3, wherein processing the time window of transient pressure information comprises following determining that the time window of transient pressure information is categorised in the second abnormal condition then successively selecting a number of time windows of transient pressure information following in time from the selected time window of transient pressure information covering a predetermined time period and determining that all time windows are categorised in the second abnormal condition.

11. The method of claim 1, wherein following processing of the time window of transient pressure information a further successive time window of transient pressure information is selected for processing.

12. The method of claim 1, wherein the anomaly include:
    a leak in the pipeline;
    a burst in the pipeline;
    a closure or opening of a valve in the pipeline; or
    a non-characteristic flow event.

13. The method of claim 1, wherein characteristics associated with the anomaly include:
    a location of the anomaly;
    a physical size of the anomaly; or
    a flow rate of liquid associated with the anomaly.

14. The method of claim 1, wherein the classifier ANN is trained to categorise a pipeline operating condition by:
    selecting a range of anomaly types and associated ranges of anomaly characteristics;
    generating respective time windows of transient pressure information for the range of anomaly types and associated ranges of values of the anomaly characteristics;
    down sampling the respective time windows of transient pressure information to form respective down sampled time windows of transient pressure information each having a size corresponding to the size of the input of the classifier ANN;

assigning a respective pipeline operating condition to each of the respective down sampled time windows of transient information; and training the classifier ANN to determine the pipeline operating condition based on each of the respective down sampled time windows of pressure information and the assigned respective pipeline operating condition.

15. The method of claim 14, wherein the classifier ANN is trained to determine a respective anomaly type and associated anomaly characteristics by:

training the classifier ANN to determine the respective anomaly type and associated anomaly characteristics based on each of the respective down sampled time windows of transient pressure information and their anomaly type and anomaly characteristics.

16. The method of claim 14, wherein generating respective time windows of transient pressure information for the range of anomaly types and associated ranges of values of the anomaly characteristics includes numerically generating one or more of the respective time windows of transient pressure information based on a hydrodynamic model of the pipeline.

17. The method of claim 14, wherein generating respective time windows of transient pressure information for the range of anomaly types and associated ranges of values of the anomaly characteristics includes basing one or more of the respective time windows of transient pressure information on historical pressure information.

18. A system for real time monitoring of the condition of a pipeline, the system including:

a pressure detector for monitoring transient pressure information of a fluid in the pipeline;

an analysis module comprising one or more data processors for:

selecting a time window of transient pressure information; and processing the time window of transient pressure information to detect an anomaly in the pipeline, wherein processing the time window of transient pressure information by the analysis module comprises:

down sampling the time window of transient pressure information to generate a down sampled time window of pressure information; and processing the down sampled time window of transient pressure information by a classifier artificial neural network (ANN) trained to categorise a pipeline operating condition, wherein a size of the down sampled time window of transient pressure information has a same size as an input to the classifier ANN; and determining by the classifier ANN the pipeline operating condition for the time window.

19. The system of claim 18, wherein the pipeline operating condition is categorised as a normal operating condition where no anomaly is present in the time window of transient pressure information or an abnormal pressure condition where an anomaly is present in the time window of transient pressure information.

20. The system of claim 19, wherein the category of abnormal pressure condition is further categorised into a first abnormal pressure condition signifying only a presence of an anomaly in the time window of transient pressure information or a second abnormal condition where not only the presence of an anomaly is detected in the time window of transient pressure information but also that anomaly characteristics related to the anomaly in the time window of transient pressure information may be determined.

21. The system of claim 20, wherein processing the time window of transient pressure information by the analysis module comprises:

following determining that the time window of transient pressure information is categorised in the second abnormal condition; then processing the down sampled time window of transient pressure information by a first anomaly detector ANN trained to detect a first type of anomaly in the pipeline and to determine associated anomaly characteristics for the first type of anomaly; and verifying whether the first type of anomaly is detected in the time window of transient pressure information.

22. The system of claim 21, wherein verifying whether the first type of anomaly is detected in the time window of transient pressure information comprises determining whether the determined associated anomaly characteristics are consistent with the pipeline.

23. The system of claim 22, wherein determining whether the determined associated anomaly characteristics are consistent with the pipeline includes determining whether a location of the anomaly is consistent with a length of pipeline.

24. The system of claim 22, wherein on determining that the determined associated anomaly characteristics are consistent with the pipeline, verifying whether the first type of anomaly is detected in the time window of transient pressure information further comprises:

numerically generating a time window of theoretical pressure information based on the first anomaly type and associated anomaly characteristics;

comparing the selected time window of transient pressure information as measured with the time window of theoretical pressure information as numerically generated to determine a comparison measure; and applying a comparison threshold to the comparison measure to indicate that the first type of anomaly is detected in the time window of transient pressure information.

25. The system of claim 24, wherein on determining that the numerically generated time window of transient pressure information is partially consistent with the selected time window of transient pressure information the system further comprises:

refining one or more anomaly characteristics to obtain a better match between the numerically generated time window of transient pressure information and the selected time window of transient pressure information.

26. The system of claim 21, wherein on failing to verify that the first type of anomaly is detected in the time window of transient pressure information the system comprises processing the down sampled time window of transient pressure information by a second anomaly detector ANN trained to detect a second type of anomaly in the pipeline and to determine associated anomaly characteristics for the second type of anomaly.

27. The system of claim 20, wherein processing the time window of transient pressure information comprises following determining that the time window of transient pressure information is categorised in the second abnormal condition then successively selecting a number of time windows of transient pressure information following in time from the selected time window of transient pressure information covering a predetermined time period and determining that all time windows are categorised in the second abnormal condition.

28. The system of claim 18, wherein following processing of the time window of transient pressure information a further successive time window of transient pressure information is selected for processing by the analysis module.

29. The system of claim 18, wherein the anomaly include:
   a leak in the pipeline;
   a burst in the pipeline;
   a closure or opening of a valve in the pipeline; or
   a non-characteristic flow event.

30. The system of claim 18, wherein characteristics associated with the anomaly include:
   a location of the anomaly;
   a physical size of the anomaly; or
   a flow rate of liquid associated with the anomaly.

31. The system of claim 18, wherein the classifier ANN is trained to categorise a pipeline operating condition by:
   selecting a range of anomaly types and associated ranges of anomaly characteristics;
   generating respective time windows of transient pressure information for the range of anomaly types and associated ranges of values of the anomaly characteristics;
   down sampling the respective time windows of transient pressure information to form respective down sampled time windows of transient pressure information each having a size corresponding to the size of the input of the classifier ANN;
   assigning a respective pipeline operating condition to each of the respective down sampled time windows of transient pressure information; and
   training the classifier ANN to determine the pipeline operating condition based on each of the respective down sampled time windows of pressure information and the assigned respective pipeline operating condition.

32. The system of claim 31, wherein the classifier ANN is trained to determine a respective anomaly type and associated anomaly characteristics by:
   training the classifier ANN to determine the respective anomaly type and associated anomaly characteristics based on each of the respective down sampled time windows of transient pressure information and their anomaly type and anomaly characteristics.

33. The system of claim 31, wherein generating respective time windows of transient pressure information for the range of anomaly types and associated ranges of values of the anomaly characteristics includes numerically generating one or more of the respective time windows of transient pressure information based on a hydrodynamic model of the pipeline.

34. The system of claim 31, wherein generating respective time windows of transient pressure information for the range of anomaly types and associated ranges of values of the anomaly characteristics includes basing one or more of the respective time windows of transient pressure information on historical pressure information.

* * * * *